United States Patent
Oshio

(10) Patent No.: US 9,670,407 B2
(45) Date of Patent: Jun. 6, 2017

(54) RARE EARTH PHOSPHOVANADATE PHOSPHOR AND METHOD FOR PRODUCING THE SAME

(71) Applicant: Panasonic Corporation, Kadoma-shi, Osaka (JP)

(72) Inventor: Shozo Oshio, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/313,385

(22) Filed: Jun. 24, 2014

(65) Prior Publication Data

US 2014/0306159 A1    Oct. 16, 2014

Related U.S. Application Data

(63) Continuation of application No. PCT/JP2012/006564, filed on Oct. 12, 2012.

(30) Foreign Application Priority Data

Dec. 26, 2011    (JP) .................................. 2011-283167

(51) Int. Cl.
C09K 11/81    (2006.01)
C01B 25/45    (2006.01)
(Continued)

(52) U.S. Cl.
CPC ........... *C09K 11/7795* (2013.01); *H01J 11/42* (2013.01); *Y10T 428/2982* (2015.01)

(58) Field of Classification Search
CPC .......................... C09K 11/7794; C09K 11/7795
See application file for complete search history.

(56) References Cited

U.S. PATENT DOCUMENTS

| | | | |
|---|---|---|---|
| 3,417,027 A | | 12/1968 | Wanmaker et al. |
| 4,041,319 A | * | 8/1977 | Fukuzawa .......... C09K 11/7708 250/483.1 |

(Continued)

FOREIGN PATENT DOCUMENTS

| | | |
|---|---|---|
| JP | 57-352 | 1/1982 |
| JP | 57-353 | 1/1982 |

(Continued)

OTHER PUBLICATIONS

"Phosphor Handbook", Phosphor Research Society, Tokyo, Ohmsha, Ltd., 1987, pp. 233-235 and pp. 332-333.

(Continued)

*Primary Examiner* — Carol M Koslow
(74) *Attorney, Agent, or Firm* — Hamre, Schumann, Mueller & Larson, P.C.

(57) ABSTRACT

Provided is a rare earth phosphovanadate phosphor that is excellent in emission characteristics and preferred also from the viewpoint of industrial production, and a production method thereof. The rare earth phosphovanadate phosphor includes at least a primary particle in which a linear uneven pattern including a plurality of ridge lines parallel to each other is formed on the surface of the particle. Further, the method for producing a rare earth phosphovanadate phosphor involves generating a mixture of a rare earth phosphovanadate phosphor and an alkali metal vanadate, and removing the alkali metal vanadate.

19 Claims, 23 Drawing Sheets

(51) Int. Cl.
    *C09K 11/77*    (2006.01)
    *H01J 11/42*    (2012.01)

(56) References Cited

U.S. PATENT DOCUMENTS

| | | | | |
|---|---|---|---|---|
| 4,107,571 | A * | 8/1978 | Tanimizu | C09K 11/7795 |
| | | | | 252/301.4 P |
| 6,590,333 | B1 * | 7/2003 | Suzuki | C09K 11/7777 |
| | | | | 252/301.4 F |
| 2012/0025137 | A1 | 2/2012 | Buisette et al. | |
| 2012/0032113 | A1 | 2/2012 | Buissette et al. | |

FOREIGN PATENT DOCUMENTS

| | | |
|---|---|---|
| JP | 2004-256763 | 9/2004 |
| JP | 2007-231097 | 9/2007 |
| JP | 2010-254836 | 11/2010 |
| WO | WO 2010/108815 | 9/2010 |
| WO | WO 2010/112394 | 10/2010 |

OTHER PUBLICATIONS

Chinese Office Action, Feb. 4, 2015; Chinese Application No. 201280064687.4 together with English translation of its Search Report (14 pages).

* cited by examiner (a)

×3,000

(b)

×10,000

(a)  × 3,000

(b)  × 10,000

(a) Example 1

(d) Example 4

(b) Example 2

(e) Comparative Example 1

(c) Example 3

(a) Example 5

(d) Example 8

(b) Example 6

(e) Example 9

(c) Example 7

(f) Comparative Example 2

(a) Example 10

(b) Example 11

(c) Example 12

(a) Comparative Example 3

(c) Comparative Example 5

(b) Comparative Example 4

(d) Comparative Example 6

(a) Example 16

(d) Example 19

(b) Example 17

(e) Example 20

(c) Example 18

(f) Example 21

(a)  Example 39

(b)  Example 40

(c)  Comparative Example 9

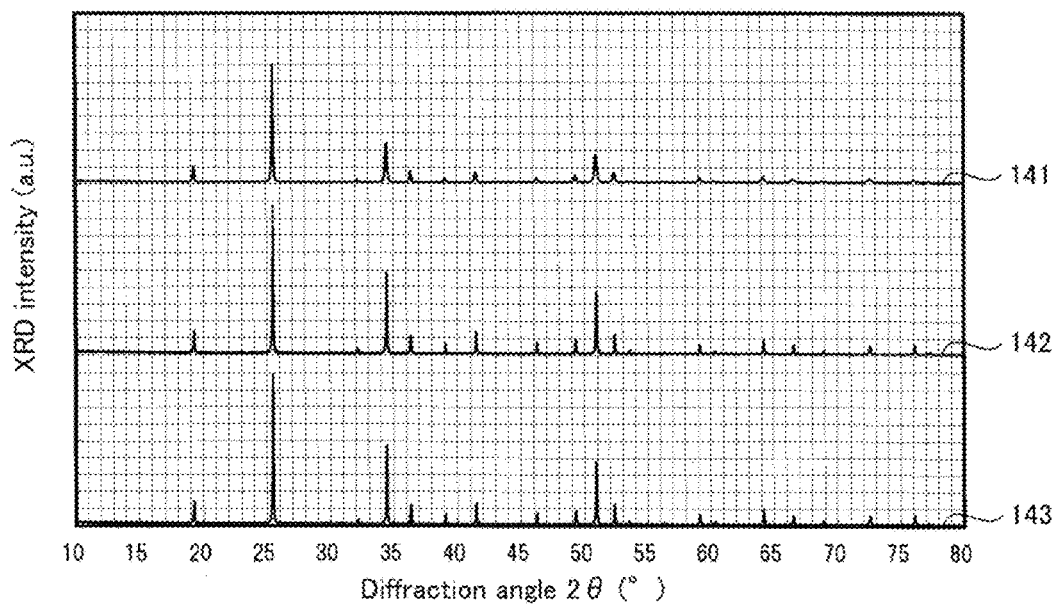
F I G. 25
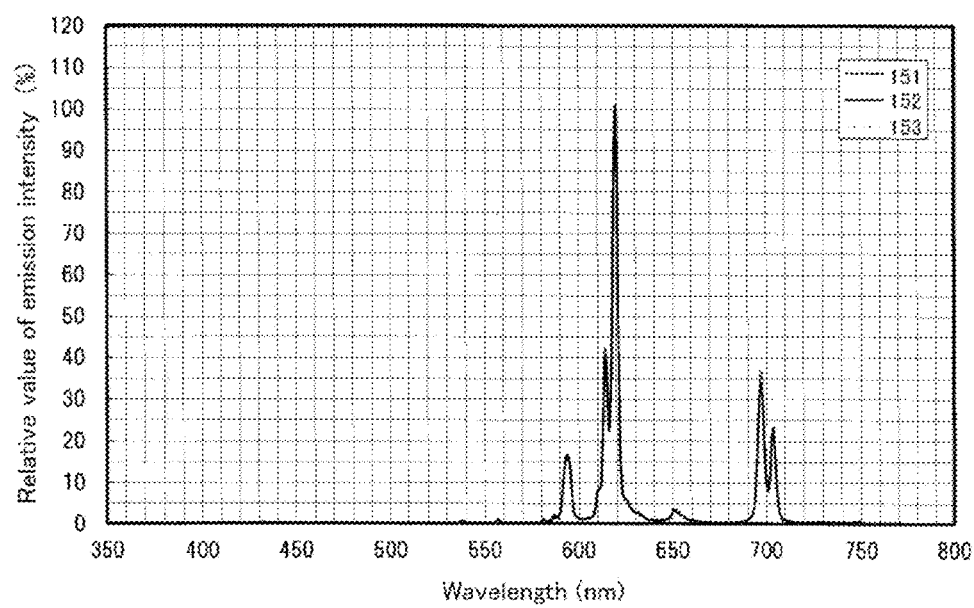
F I G. 26

RARE EARTH PHOSPHOVANADATE PHOSPHOR AND METHOD FOR PRODUCING THE SAME

TECHNICAL FIELD

The present disclosure relates to a rare earth phosphovanadate phosphor applicable to a display device and a light-emitting device (e.g., an illumination light source) such as a plasma display panel (PDP), a fluorescent lamp (FL), and a field emission display (FED), and a method for producing the rare earth phosphovanadate phosphor.

BACKGROUND ART

Conventionally, a rare earth phosphovanadate phosphor has been known in which a host crystal is represented by Ln(P, V)$O_4$ (where Ln represents at least one element selected from the group consisting of Sc, Y, La, Gd, and Lu). For example, Ln(P, V)$O_4$ that does not contain other ions as an activator functions as a blue phosphor, and Ln(P, V)$O_4$ ($Eu^{3+}$-activated rare earth phosphovanadate phosphor) that contains at least $Eu^{3+}$ ions as an activator functions as a red phosphor (see, for example, Patent Documents 1 to 3 and Non-Patent Document 1).

As a typical example of the rare earth phosphovanadate phosphor, there may be given a Y(P, V)$O_4$:$Eu^{3+}$ red phosphor (hereinafter, referred to as "YPV"), and the practical application of the YPV to a fluorescent lamp, a PDP, and the like is under consideration.

Conventionally, a rare earth phosphovanadate phosphor that has been put into practical use for an electronic device is produced by a general solid phase reaction, and is produced by reacting a phosphor material to which an alkali metal compound or a boron compound has been added as a flux at a firing temperature of 1,050 to 1,600° C. Conventionally, a flux to be used for the production of the rare earth phosphovanadate phosphor is added to a phosphor material without considering the mixed amounts of a vanadium atom, a phosphorus atom, and an yttrium atom, and the amount of the flux to be added merely is selected appropriately so that emission characteristics of a phosphor become maximum experimentally.

A phosphor produced by a conventional production method using a flux generally is a particle group in which primary particles having an irregular shape flocculate. The primary particles generally exhibit a shape of a polyhedron (for example, a prismatic shape, a needle shape, a cubic shape, a rectangular solid) having a smooth particle surface without concave portions.

There is known a rare earth phosphovanadate phosphor produced by, for example, a spray-pyrolysis method involving heating liquid droplets of a solution (material solution) containing constituent elements of the phosphor to perform pyrolysis synthesis, besides those produced by the solid phase reaction. A phosphor produced by the spray-pyrolysis method is known to become phosphor particles in a spherical outer shape having substantially irregular surface unevenness.

PRIOR ART DOCUMENTS

Patent Documents

Patent Document 1: U.S. Pat. No. 3,417,027
Patent Document 2: JP 57(1982)-352 B
Patent Document 3: JP 57(1982)-353 B

Non-Patent Document

Non-Patent Document 1: Phosphor Handbook, pp. 233-235, pp. 332-333, published by Ohmsha, Ltd.

DISCLOSURE OF INVENTION

Problem to be Solved by the Invention

However, a conventional rare earth phosphovanadate phosphor produced without using a flux has the following problems: the phosphor tends to have degraded crystal quality due to insufficient reaction, and the particle size increases when an attempt is made to obtain a phosphor of satisfactory crystal quality. On the other hand, a rare earth phosphovanadate phosphor produced through use of a flux has the following problem: a compound containing elements other than those forming a phosphor host must be used. Even though the amount thereof is small, compositional deviation, contamination with impurities, and the like of a phosphor are likely to occur, with the result that the phosphor tends to have degraded crystal quality.

Therefore, the conventional rare earth phosphovanadate phosphor does not sufficiently exhibit emission characteristics originally possessed by the phosphor, which causes low luminance and long afterglow of the phosphor. There is also a problem that sufficient characteristics cannot be obtained, either, in a light-emitting device using the conventional rare earth phosphovanadate phosphor.

The present disclosure provides a rare earth phosphovanadate phosphor that is excellent in emission characteristics and that is also preferred from the viewpoint of industrial production, and a method for producing the rare earth phosphovanadate phosphor.

Means for Solving Problem

A rare earth phosphovanadate phosphor in the present disclosure includes at least a primary particle in which a linear uneven pattern including a plurality of ridge lines parallel to each other is formed on a surface of the particle.

Further, a method for producing a rare earth phosphovanadate phosphor in the present disclosure includes: forming a mixture of a rare earth phosphovanadate phosphor and an alkali metal vanadate; and removing an alkali metal compound from the mixture.

Effects of the Invention

The present disclosure can provide a rare earth phosphovanadate phosphor that is excellent in emission characteristics and that is also preferred from the viewpoint of industrial production. Thus, a light-emitting device that exhibits optical characteristics at a high level, and in particular, a PDP excellent in display quality for a three-dimensional video can be provided.

BRIEF DESCRIPTION OF DRAWINGS

FIG. 25 is a graph showing a comparison of X-ray diffraction patterns of the rare earth phosphovanadate phosphors according to the examples and the comparative example.

FIG. 26 is a graph showing emission spectra of the rare earth phosphovanadate phosphors according to the examples and the comparative example.

DESCRIPTION OF THE INVENTION

Figure 1:
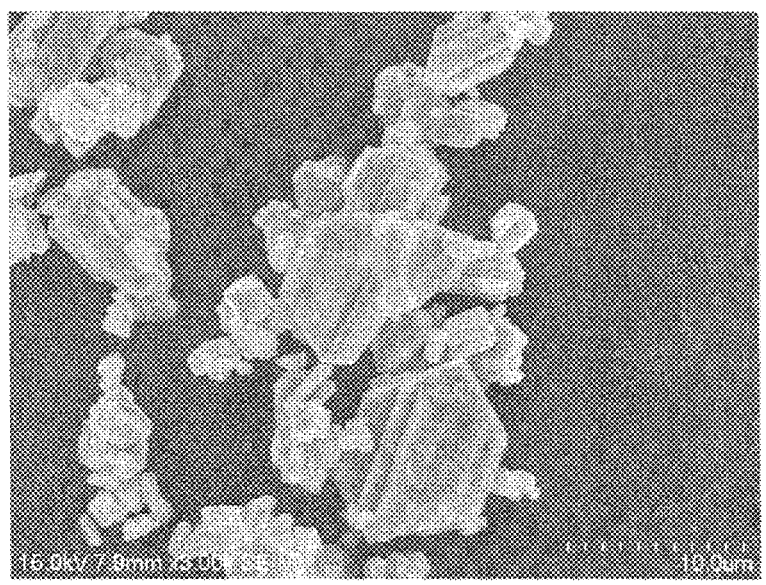
FIG. 1 is electron micrographs of a rare earth phosphovanadate phosphor in the present disclosure.
Figure 1:
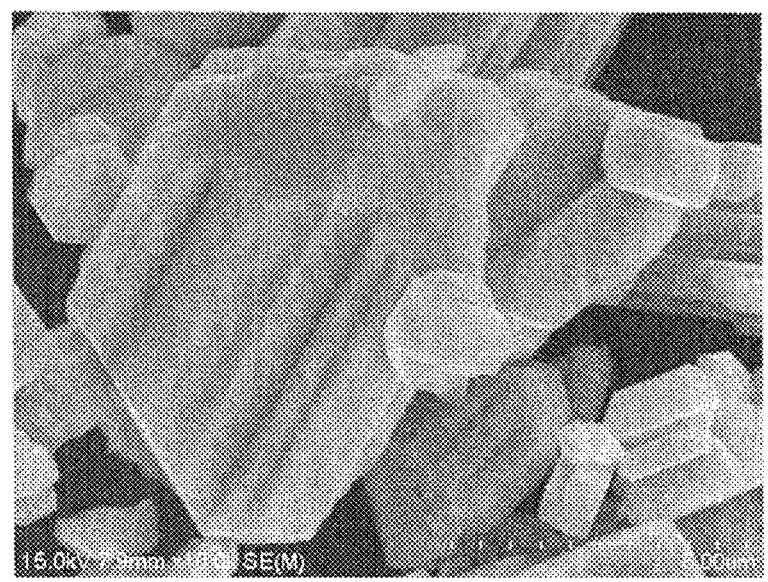

The inventors of the present invention found that a conventionally known rare earth phosphovanadate phosphor is incomplete from the viewpoint of crystal quality and can exhibit emission characteristics higher than those of the conventional example when produced by a particular production method using a flux. The inventors of the present invention also found that the rare earth phosphovanadate phosphor produced by the particular production method contains at least primary particles having a unique shape not found in the conventional example. Further, although it has been conventionally believed that a flux accelerates the growth of particles of a phosphor, the following was also found according to the study by the inventors of the present invention: an alkali metal compound serving as a flux also functions so as to suppress the growth of particles contrary to expectations, thereby making it easy to obtain a small particulate phosphor (central particle diameter: about 1 to 5 μm) having high emission characteristics. It was also found that it is easy to obtain a phosphor particle having satisfactory dispersibility in which almost no flocculation of phosphor particles is found.

Further, although it has been conventionally believed that a high firing temperature accelerates the growth of particles of a phosphor, it was also found according to the study by the inventors of the present invention that a particle size of a phosphor can be determined substantially irrespective of a firing temperature, and it is easy to control a particle diameter. It also was found that the rare earth phosphovanadate phosphor in the present disclosure can be obtained so as to have emission characteristics at a high level close to that of a final form by water washing, and hence, the burden of an acid-alkali treatment can be alleviated.

Conventionally, it has been known that a produced rare earth phosphovanadate phosphor tends to contain vanadium in an insufficient amount with respect to a charge composition. The reason for this is considered as follows: a vanadium compound having high volatility volatilizes. However, as a result of closer investigation, it was found that, in the case where an alkali metal is not used as a flux, the volatilization of a vanadium component is hardly recognized. With this finding being an impetus, it was found that a vanadium component is likely to react with an alkali metal component to be used as a flux, and is likely to generate a vanadium compound of an alkali metal having solubility with respect to water, in particular, an alkali metal metavanadate, in the case where an alkali metal is used as a flux. Then, it was also found that the vanadium compound of an alkali metal is removed during washing including a water treatment, and hence, the rare earth phosphovanadate phosphor becomes a composition containing vanadium in an insufficient amount with respect to a charge composition.

The present invention has been achieved by the finding of the above-mentioned results of the study. Hereinafter, the rare earth phosphovanadate phosphor in the present disclosure and a production method thereof are described specifically.

Figure 2:
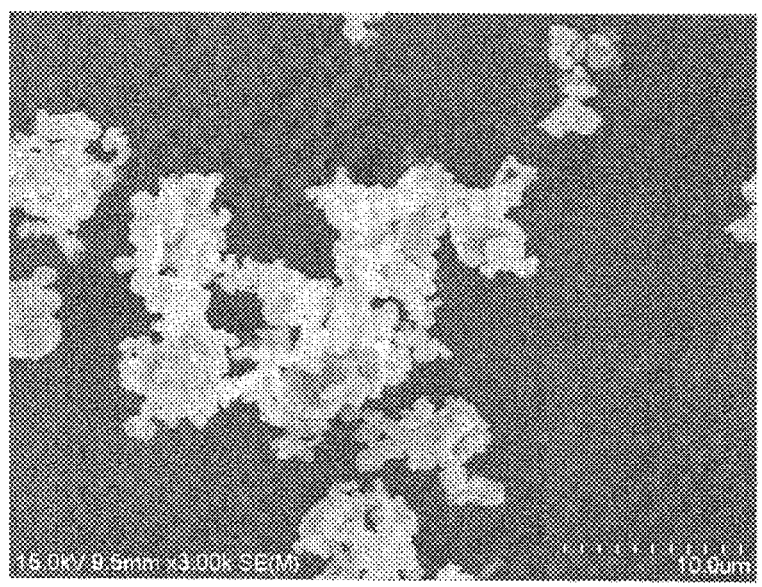
FIG. 2 is electron micrographs of the rare earth phosphovanadate phosphor in the present disclosure.
Figure 2:
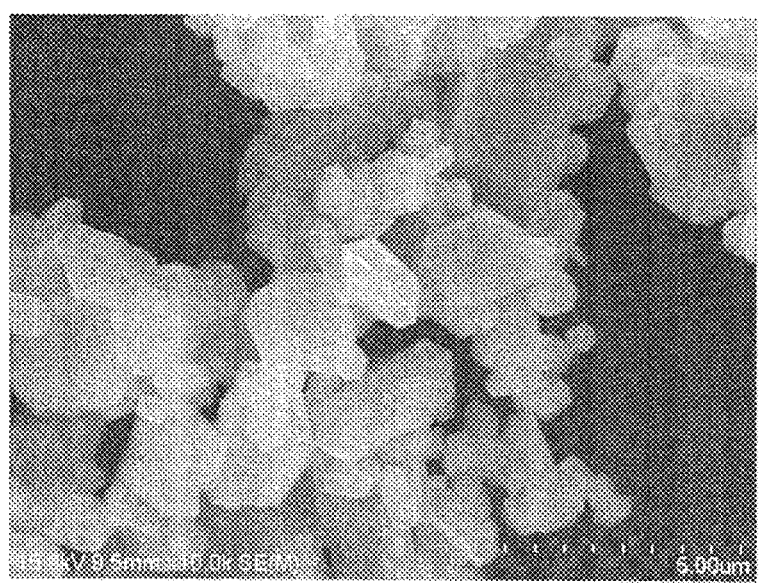

FIGS. 1 and 2 are electron micrographs of the rare earth phosphovanadate phosphor in the present disclosure. In FIGS. 1 and 2, (a) is an electron micrograph magnified by 3,000 times, and (b) is an electron micrograph magnified by 10,000 times.

As shown in FIGS. 1 and 2, the rare earth phosphovanadate phosphor in the present disclosure contains at least primary particles having a linear uneven pattern on the surfaces of the particles. The linear uneven pattern includes a plurality of ridge lines parallel to each other, and a portion between the ridge lines forms a thin elongated plane. Further, the rare earth phosphovanadate phosphor in the present disclosure is formed of a group of particles in which the primary particles gather.

FIGS. 1 and 2 respectively show a typical example of a surface shape of the particle of the rare earth phosphovanadate phosphor in the present disclosure, and the rare earth phosphovanadate phosphor in the present disclosure contains primary particles in such a surface shape in most cases, although there is a difference to some degree depending on production conditions.

The above-mentioned characteristic linear uneven pattern is formed by removal of substances to be impurities. Examples of the substances to be impurities include an alkali metal compound, a potassium compound, and a vanadium compound of an alkali metal such as potassium metavanadate ($KVO_3$).

The rare earth phosphovanadate phosphor in the present disclosure is obtained by blending phosphor materials so as to generate at least a mixture of a rare earth phosphovanadate phosphor and an alkali metal vanadate, in particular, an alkali metal metavanadate ($KVO_3$, $NaVO_3$, $LiVO_3$, etc.), reacting the blend of the phosphor materials to generate a mixture of the rare earth phosphovanadate phosphor and the alkali metal vanadate, and removing the alkali metal vanadate.

Thus, when the generated alkali metal vanadate is removed, portions in which the alkali metal vanadate has been generated are scooped out, whereby a unique uneven pattern that is to be a generation mark of an alkali metal vanadate is formed on each surface of primary particles. Note that the uneven pattern also can be understood as a pattern that seems to flow in one direction.

As a result, a rare earth phosphovanadate phosphor containing at least primary particles having a linear uneven pattern including a plurality of ridge lines parallel to each other on the surfaces of the particles is obtained. Such a rare earth phosphovanadate phosphor exhibits satisfactory emission characteristics.

Note that, by changing a reaction process, a rare earth phosphovanadate phosphor containing at least primary particles in a shape of a pseudo-octahedron also can be obtained as the rare earth phosphovanadate phosphor in the present disclosure.

In a method for producing a rare earth phosphovanadate phosphor in the present disclosure, there is no particular limit to a generation ratio of an alkali metal vanadate (for example, an alkali metal metavanadate). However, for example, the generation ratio is in a range of 0.001 to 10 moles, preferably 0.003 to 1 mole, particularly preferably 0.01 to 0.3 moles with respect to one mole of a rare earth phosphovanadate phosphor generated simultaneously in the mixture.

When the generation ratio of an alkali metal metavanadate is close to zero, an alkali metal component does not sufficiently function as a flux, and the reactivity between the materials becomes poor. Therefore, under the production condition of a relatively low firing temperature of 1,000° C. or more and less than 1,300° C. suitable for industrial production, it is difficult to expect that a phosphor having satisfactory emission characteristics will be produced. However, under the production condition of a relatively high firing temperature of 1,300° C. or more and less than 1,650° C., in particular, 1,400° C. or more and less than 1,600° C. at which the reactivity between the materials is enhanced because the generation ratio of an alkali metal to be impurities is low, a rare earth phosphovanadate phosphor capable of having satisfactory emission characteristics is obtained.

On the other hand, in the case where the generation ratio of an alkali metal metavanadate is as high as 0.01 moles or more, in particular, 0.03 moles or more, the reactivity between the materials becomes satisfactory because an alkali metal component sufficiently functions as a flux. Therefore, it is possible for a phosphor to be produced under the production condition of a relatively low firing temperature of 1,000° C. or more and less than 1,300° C. suitable for industrial production. Further, an alkali metal metavanadate to be generated acts so as to inhibit the growth of particles of a rare earth phosphovanadate phosphor, and hence, particles can be reduced in size relatively easily. However, the ratio of an alkali metal component to be impurities is high, and hence, there is a risk in that a rare earth phosphovanadate phosphor containing a relatively large amount of impurities may be generated depending on the procedure.

Further, a reaction probability between the rare earth compound and the phosphorus compound serving as materials for a rare earth phosphovanadate phosphor decreases, and a reaction probability between the rare earth compound and the vanadium compound greatly increases, and hence, a rare earth phosphovanadate phosphor containing vanadium in a higher ratio than a desired composition is likely to be generated, which makes it difficult to control the composition of the phosphor.

In the case where the generation ratio of an alkali metal metavanadate is close to zero, it is difficult to recognize a unique linear uneven pattern on each surface of primary particles. A method for producing a rare earth phosphovanadate phosphor in the present disclosure involves reacting a material mixture obtained by blending phosphor materials intentionally so that at least a mixture of a rare earth phosphovanadate phosphor and an alkali metal vanadate is generated to generate a mixture of the rare earth phosphovanadate phosphor and the alkali metal vanadate, and removing the alkali metal vanadate. Therefore, the method for producing a rare earth phosphovanadate phosphor in the present disclosure is not limited to a method for producing only a rare earth phosphovanadate phosphor in which a characteristic linear uneven pattern is recognized visually.

According to the results of experimental verification, it is preferred that an alkali metal be potassium and that a material mixture do not contain boron.

This is based on the fact that a rare earth phosphovanadate phosphor exhibits the most satisfactory emission characteristics when a potassium compound is used among alkali metal compounds. Further, in the case where a material mixture of a phosphor contains, for example, a boron compound, the growth of particles along with an increase in a firing temperature is recognized, and it becomes difficult to obtain a rare earth phosphovanadate phosphor having high luminance and containing small particles.

As the rare earth phosphovanadate phosphor in the present disclosure, for example, a rare earth phosphovanadate phosphor (for example, a Y(P, V)O$_4$ blue phosphor) not containing ions (for example, Sm$^{3+}$, Eu$^{3+}$, Dy$^{3+}$, Ho$^{3+}$ and other rare earth ions) functioning as luminescent center ions and various kinds of rare earth phosphovanadate phosphors (for example, a Y(P, V)O$_4$:Eu$^{3+}$ red phosphor) containing ions functioning as luminescent center ions can be obtained. The rare earth phosphovanadate phosphor activated with Eu$^{3+}$ is preferred.

The rare earth phosphovanadate phosphor activated with Eu$^{3+}$ has a main emission peak for its emission line shape in a red wavelength region in the vicinity of 619 to 620 nm and emits red light having satisfactory color purity. Therefore, the rare earth phosphovanadate phosphor activated with Eu$^{3+}$ is a red phosphor preferred from the viewpoint of a color tone of light to be emitted, as a display device, an illumination light source, etc.

Further, the rare earth phosphovanadate phosphor activated with Eu$^{3+}$ can absorb particle beams (for example, electron beams) and electromagnetic waves having a short wavelength (for example, vacuum ultraviolet rays, far ultraviolet rays, near ultraviolet rays) and convert the wavelength thereof into that of red light at satisfactory photon conversion efficiency. Therefore, the rare earth phosphovanadate phosphor activated with Eu$^{3+}$ is preferred also from the viewpoint of emission efficiency as a light-emitting device (for example, a PDP, an FED, an FL).

Hereinafter, the general outline of a method for producing a rare earth phosphovanadate phosphor in the present disclosure is described.

(Blending Step)

The rare earth phosphovanadate phosphor in the present disclosure can be produced by an ordinary solid phase reaction. Note that the production method in the present disclosure is not limited to a production method using a solid phase reaction.

As materials, a substance containing a rare earth element, a substance containing phosphorus, and a substance containing vanadium may be selected appropriately.

As the substance containing a rare earth element, a metal rare earth element or a rare earth compound can be selected. It is preferred to use a rare earth oxide that is easily available and easy to handle. Examples of the rare earth oxide include Sc$_2$O$_3$, Y$_2$O$_3$, La$_2$O$_3$, Eu$_2$O$_3$, Gd$_2$O$_3$, Lu$_2$O$_3$, (Y, Eu)$_2$O$_3$, (Gd, Eu)$_2$O$_3$, (Y, Sc, Eu)$_2$O$_3$, and (Y, Gd, Eu)$_2$O$_3$, and the rare earth oxide is selected appropriately therefrom to be used. Besides the rare earth oxide, a rare earth carbonate, a rare earth oxalate, a rare earth nitrate, or the like can be used.

As the substance containing phosphorus, metallic phosphorus or a phosphorus compound can be selected, and it is preferred to use ammonium phosphates ((NH$_4$)$_2$HPO$_4$, etc.) that are easily available and easy to handle.

As the substance containing vanadium, metallic vanadium or a vanadium compound can be selected, and it is preferred to use vanadium oxide (V$_2$O$_5$, etc.) or an ammonium salt (NH$_4$VO$_3$) of vanadic acid that is easily available and easy to handle.

Further, as the flux, an alkali metal compound (in particular, an alkali metal carbonate (Li$_2$CO$_3$, Na$_2$CO$_3$, K$_2$CO$_3$, etc.) and an alkali metal nitrate (LiNO$_3$, NaNO$_3$, KNO$_3$, etc.)) is used. As the alkali metal compound, a vanadate containing an alkali metal (for example, KVO$_3$) and a phosphate containing an alkali metal (for example, NaH$_2$PO$_4$) also can be used.

A flux particularly preferred for enhancing emission characteristics of a rare earth phosphovanadate phosphor to be generated and reducing the particle size thereof is a vanadate containing an alkali metal, and a preferred added amount of the flux in this case is 0.01 moles or more and less than 0.1 moles (1 mol % or more and less than 10 mol %), particularly preferably 0.01 moles or more and 0.04 moles or less (1 mol % or more and 4 mol % or less) with respect to 1 mole of a rare earth phosphavanadate phosphor to be obtained by the reaction.

By setting the flux as described above, a phosphor formed of small particles can be generated in which a BET value of a rare earth phosphovanadate phosphor measured by a BET fluid process using nitrogen gas becomes more than 1.6 m$^2$/g and less than 2.5 m$^2$/g.

Next, phosphor materials are blended so as to generate a mixture of a rare earth phosphovanadate phosphor and an alkali metal metavanadate.

This means the following: phosphor materials are blended intentionally so that a mixture of Ln(P, V)O$_4$ and xAVO$_3$, that is, a mixture represented by Ln(P, V)O$_4$+xAVO$_3$ is generated, where a rare earth phosphovanadate phosphor is presented by, for example, Ln(P, V)O$_4$, and an alkali metal metavanadate as an example of an alkali metal vanadate is represented by, for example, AVO$_3$.

Note that Ln represents at least one kind of rare earth element selected from Sc, Y, La, Gd, and Lu. Further, A represents at least one kind of alkali metal selected from Li, Na, K, Rb, and Cs. Further, "x" represents a numerical value satisfying 0.001≤x≤10. Further, a metal ion other than Ln, in particular, an ion (for example, Eu$^{3+}$) other than rare earth elements functioning as a luminescent center ion can be substituted for a part of Ln. Ln is preferably at least one kind of rare earth element selected from Y and Gd, more preferably a form in which Y occupies a majority, particularly preferably a form in which all the rare earth elements are Y. Further, A is preferably at least one kind of alkali metal selected from Na and K, more preferably a form in which K occupies a majority, particularly preferably a form in which all the alkali metals are K. Further, "x" is preferably a numerical value satisfying 0.003≤x≤1, particularly preferably a numerical value satisfying 0.01≤x≤0.3.

By setting the mixture as described above, a rare earth phosphovanadate phosphor exhibiting satisfactory emission characteristics is obtained.

In the method for producing a rare earth phosphovanadate phosphor in the present disclosure, a reaction mechanism in which an alkali metal (A) and a rare earth element (Ln) that has not reacted completely with phosphorus competitively take vanadium and a reaction mechanism in which an alkali metal takes phosphorus in the same way as in a rare earth element function.

Further, considering a melting point (>1,700° C.) of the rare earth phosphovanadate phosphor and a melting point (for example, 520° C. for KVO$_3$ and 807° C. for KPO$_3$) of an alkali metal metavanadate or an alkali metal metaphosphate, it is assumed that an alkali metal is more likely to take vanadium or phosphorus, compared with a rare earth element.

Therefore, when a blended ratio of insufficient vanadium or insufficient phosphorus is obtained with respect to a stoichiometric composition as a mixture of the rare earth phosphovanadate phosphor and the alkali metal metavanadate, there is a risk in that vanadium or phosphorus is taken by an alkali metal, resulting in a rare earth phosphovanadate phosphor with a compositional deviation.

Therefore, it is also preferred to prepare a mixture so that the mixture contains excess vanadium or phosphorus (in particular, phosphorus) with respect to the chemical stoichiometric composition as the mixture. Note that, in the case where vanadium or phosphorus to be the chemical stoichiometric composition as the mixture is set to an amount of 100 atomic %, the amount of vanadium or phosphorus to be added as excess is, for example, 130 atomic %.

(Mixing Step)

The above-mentioned materials are weighed, blended, and mixed so that a rare earth phosphovanadate phosphor and an alkali metal vanadate in the chemical stoichiometric composition or an atomic ratio close thereto is obtained as a mixture.

The mixing may be dry mixing or wet mixing, and wet mixing is preferred for the purpose of obtaining a mixed material having a satisfactory mixed state. The mixed material also can be prepared as paste, slurry, or solution. In the case of the wet mixing, it is preferred that the mixed material be formed as a dry material in advance through a drying step conducted later.

For mixing, for example, various mixing devices such as an automatic mortar, a ball mill, a motor grinder, and a stirrer can be used.

Note that a mixed material also can be used, which is obtained by separately preparing a material for obtaining a rare earth phosphovanadate phosphor and a material for obtaining an alkali metal vanadate and mixing them.

(Decomposition Firing Step)

It is preferred that a mixed material be subjected to provisional firing (decomposition firing) for the purpose of removing unnecessary elements (for example, hydrogen, nitrogen, carbon) in advance. The provisional firing is performed, for example, under the condition of a temperature of 300° C. or more and 1,000° C. or less for 30 minutes or more and 5 hours or less in the atmosphere. Note that provisional firing also can be omitted for the purpose of simplifying a production step. In this case, the production step is preferred from the viewpoint of reducing cost.

(Firing Step)

Next, a mixture of the blended materials is reacted by means such as heating. This enables phosphor materials to react with each other, and consequently, a mixture of a rare earth phosphovanadate phosphor and an alkali metal vanadate is generated.

The firing is performed, for example, under the condition of a temperature of 1,000° C. or more and less than 1,650° C. for 30 minutes or more and 10 hours or less, particularly preferably, 2 hours or more and 5 hours or less in the atmosphere. In the solid-phase reaction, it is enough to heat a mixed material charged in a firing container.

Further, it is preferred that a reaction time of the solid phase reaction be 1 hour or more, in particular, more than 2 hours. In this case, the reaction time is long, and hence, the integrity of a crystal is enhanced, with the result that a phosphor emitting red light satisfactory from the viewpoint of color purity and is excellent from the viewpoint of short afterglow properties can be generated. A production method using such a solid phase reaction is an ordinary method for producing a phosphor and does not require a high technology. Therefore, the production method enables a phosphor to be produced relatively easily, which is preferred from the viewpoint of productivity in industrial production.

In order to obtain a phosphor formed of relatively small particles having a center particle diameter of, for example, about 1 to 5 μm with high production yield so that the phosphor can be applied to a PDP or a cold cathode fluorescent lamp (CCFL), it is preferred that the phosphor be produced at a relatively low firing temperature of 1,000° C. or more and less than 1,450° C. On the other hand, in order to obtain a phosphor formed of relatively large particles having a center particle diameter of, for example, about 5 to 20 μm with high production yield so that the phosphor can be applied to a fluorescent lamp or an electronic tube, the phosphor can be produced at a relatively high firing temperature of 1,450° C. or more and less than 1,650° C.

In general, when the firing temperature is set to a relatively low temperature of 1,000° C. or more and less than 1,450° C., a relatively long firing time (for example, 2 to 20 hours) is required for allowing phosphor materials to react sufficiently. Further, when the firing temperature is set to a relatively high temperature of 1,450° C. or more and less than 1,650° C., a relatively short firing time (for example, 1 to 5 hours) is enough.

In general, as an added amount of a flux increases, a phosphor can be synthesized at lower temperature. However, an element constituting the flux may be mixed as an impurity or an element constituting the flux may react with an element constituting the phosphor, which increases a risk that the desired rare earth phosphovanadate phosphor cannot be produced. Therefore, when the firing temperature is set to a relatively high temperature of 1,450° C. or more and less than 1,650° C., it is preferred that an added amount of the flux be a small amount of 0.01 moles or less with respect to one mole of a phosphor which is a production target. On the other hand, when the firing temperature is set to a relatively low temperature of 1,000° C. or more and less than 1,450° C., it is preferred that the an added amount of the flux be a large amount of 0.01 moles or more and 10 moles or less, in particular, 0.01 moles or more and 1 mole or less with respect to one mole of phosphor which is a production target.

(Pulverizing/Classifying/Washing Step)

Next, at least the alkali metal vanadate in the mixture is removed.

The alkali metal metavanadate has a property of dissolving in water (in particular, hot water). Therefore, when the mixture is subjected to a pulverizing treatment by a ball mill, for example, through use of water or hot water (in particular, pure water) as a solvent, the mixture is easily separated into a rare earth phosphovanadate phosphor particle group and at least a metavanadate aqueous solution to form a suspension containing both of them.

The phosphor particle group can be extracted easily from the suspension by filtration, and hence, a rare earth phosphovanadate phosphor can be extracted by filtration also serving as water washing.

After that, when the extracted and water-washed rare earth phosphovanadate phosphor is dried at a temperature of about 100° C. to 150° C., dry powder of the rare earth phosphovanadate phosphor that is a final product can be prepared. When a classifying treatment, for example, a mesh passage treatment is added after the pulverizing treatment if necessary, a rare earth phosphovanadate phosphor having an aligned granular variation can be obtained. Further, for enhancing the emission characteristics of the phosphor, it is also effective to add acid washing or alkaline washing.

(Composition of Phosphor)

The rare earth phosphovanadate phosphor in the present disclosure can be produced by the production method described above. Further, the rare earth phosphovanadate phosphor is produced by such a production method, and hence, in the case where the generation ratio of an alkali metal vanadate is high, the rare earth phosphovanadate phosphor in the present disclosure is to contain at least primary particles in which a linear uneven pattern having a plurality of parallel ridge lines is formed on the surface of each particle.

The rare earth phosphovanadate phosphor in the present disclosure is produced through use of an alkali metal compound serving as a flux. Therefore, the integrity of a crystal becomes larger at a relatively low reaction temperature, and hence, the rare earth phosphovanadate phosphor has high emission characteristics.

It is preferred that the rare earth phosphovanadate phosphor be a compound substantially represented by a chemical formula: $(Ln_{1-a}Eu_a)(P_yV_{1-y})O_4$, where Ln represents at least one kind of rare earth element selected from the group consisting of Sc, Y, La, Gd, and Lu. Further, it is preferred that "a" is a numerical value satisfying $0 \le a \le 0.03$, preferably $0.03 \le a \le 0.08$. The value of "y" satisfies preferably $0.5 \le y \le 0.9$, more preferably $0.6 \le y \le 0.8$.

Thus, a rare earth phosphovanadate phosphor containing at least a blue or red light component is obtained, which exhibits high wavelength conversion efficiency under excitation conditions of irradiating vacuum ultraviolet rays—far ultraviolet rays—near ultraviolet rays.

Further, when "a" is set to a numerical value satisfying $0 \le a \le 0.3$ in the chemical formula, a rare earth phosphovanadate phosphor emitting light containing at least a red light component is obtained, which is preferred for a light-emitting device emitting a red light component.

Note that the present invention is also applicable to the case where y=0, that is, a rare earth phosphovanadate phosphor containing no phosphorus.

Further, a rare earth phosphovanadate phosphor in which "a" is a numerical value satisfying $0.03 \le a \le 0.08$ and "y" is a numerical value satisfying $0 \le y \le 0.7$ is preferred because such a phosphor emits red light having short afterglow properties satisfactory from the viewpoint of a color tone.

Of all, a rare earth phosphovanadate phosphor in which "a" is a numerical value satisfying $0.03 \le a \le 0.08$ and "y" is a numerical value satisfying $0.5 \le y \le 0.7$ emits red light having short afterglow properties satisfactory from the viewpoint of a color tone and exhibits high wavelength conversion efficiency under excitation conditions of irradiating vacuum ultraviolet rays—far ultraviolet rays—near ultraviolet rays, and hence, is preferred for a light-emitting device.

In particular, a rare earth phosphovanadate phosphor in which "a" is a numerical value satisfying $0.03 \le a \le 0.08$ and y is a numerical value satisfying $0.6 \le y \le 0.7$ is to be a rare earth phosphovanadate phosphor having less luminance saturation involved in an increase in exciting light density, and hence, is most preferred as a phosphor applied to a light-emitting device.

In the rare earth phosphovanadate phosphor activated with $Eu^{3+}$ ions in the present disclosure, 1/10 afterglow time of red light emitted by the phosphor is preferably shorter than 3.4 msec, more preferably equal to or shorter than 3.3 msec.

Such a short afterglow rare earth phosphovanadate phosphor can be obtained in the case where "a" is a numerical value satisfying $0.03 \le a \le 0.08$ and "y" is a numerical value satisfying $0 \le y \le 0.65$.

The short afterglow rare earth phosphovanadate phosphor is preferred for a PDP performing a three-dimensional image display, and suppresses a doubled image phenomenon (crosstalk) for a video.

The present disclosure shows the finding that a rare earth phosphovanadate phosphor produced by a particular production method can have the above-mentioned unique particle shape and exhibit outstanding emission characteristics. The rare earth phosphovanadate phosphor in the present disclosure is not particularly limited as long as the phosphor has the above-mentioned features and contains at least phosphorus and vanadium. For example, there may be given various modified examples, needless to say, such as a phosphor in which another element is substituted for a part of a constituent element, a phosphor containing a trace amount of metal impurities (for example, Tb) in the order of several ppm to several %, a phosphor to which a small amount of compound such as $SiO_2$ that can serve as a sintering aid is added, a phosphor of a composition slightly shifted from a chemical stoichiometric composition, and a phosphor in which the surface of each particle is coated with another substance.

In particular, according to a method for producing a rare earth phosphovanadate phosphor involving adding silicon oxide such as $SiO_2$ as an impurity, the enhancement of crystallinity of an obtained phosphor is recognized, and the enhancement of emission characteristics by about several % is also recognized, compared with the case where silicon oxide is not added.

Note that, in this case, the enhancement of emission characteristics is recognized by setting an added amount of silicon oxide to 0.003 moles or more and 0.03 moles or less (0.3 mol % or more and 3 mol % or less) with respect to one mole of a rare earth phosphovanadate phosphor to be produced.

Next, an embodiment in the case of using the rare earth phosphovanadate phosphor in the present disclosure in a light-emitting device is described.

A light-emitting device to be described in the present embodiment is constructed through use of the rare earth phoshpovanadate phosphor in the present disclosure, in particular, the rare earth phosphovanadate phosphor emitting red light. Specific examples thereof include a display device typified by a PDP and an illumination light source typified by a fluorescent lamp or a fluorescent mercury lamp. Note that the light-emitting device to be described in the present embodiment widely includes a solar cell including a wavelength converter for wavelength-converting ultraviolet rays or shortwave visible light into red light, an optical sensor and an indicator using a function of wavelength-converting a phosphor, and a medical application electronic device.

In particular, the light-emitting device is preferably a light-emitting device that exhibits high optical characteristics through use of high emission characteristics of a red phosphor and short afterglow properties of less than 3.5 msec in the present disclosure. A preferred light-emitting device is a display device, and a most preferred light-emitting device is a PDP for a plasma display device for displaying a three-dimensional image.

Hereinafter, a PDP that is a light-emitting device to be described in the present embodiment is described with reference to the drawings, taking a plasma display device as an example.

Figure 3:
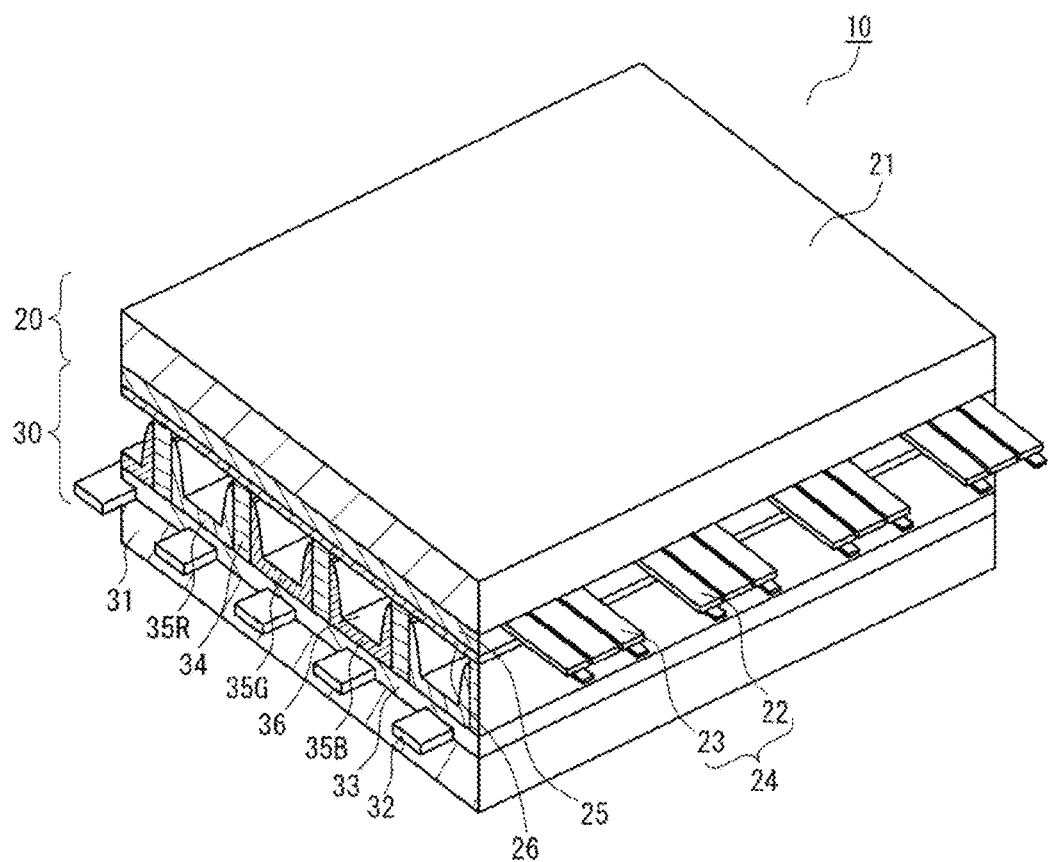
FIG. 3 is a cross-sectional perspective view showing a configuration of a PDP forming a plasma display device.

FIG. 3 is a cross-sectional perspective view showing a configuration of a PDP 10 constituting a plasma display device as a light-emitting device of the present embodiment.

The PDP 10 includes a front plate 20 and a back plate 30. The front plate 20 includes a front glass substrate 21, and a plurality of display electrode pairs 24, each pair being formed of a scanning electrode 22 and a sustaining electrode 23, is arranged in parallel on the front glass substrate 21. Then, a dielectric layer 25 is formed so as to cover the scanning electrodes 22 and the sustaining electrodes 23, and a protective layer 26 is formed on the dielectric layer 25.

On the other hand, the back plate 30 includes a back glass substrate 31, and a plurality of address electrodes 32 arranged in parallel is formed on the back glass substrate 31. Further, an underlying dielectric layer 33 is formed so as to cover the address electrodes 32, and partition walls 34 are formed on the underlying dielectric layer 33. Then, red phosphor layers 35R, green phosphor layers 35G, and blue phosphor layers 35B respectively emitting red color light, green color light, and blue color light successively are provided so as to correspond to the address electrodes 32 on side surfaces of the partition walls 34 and the underlying dielectric layer 33.

The front plate 20 and the back plate 30 are opposed to each other so that the display electrode pairs 24 and the address electrodes 32 cross each other with a minute discharge space interposed therebetween, and an outer periphery thereof is sealed with a sealing member such as glass frit. A mixed gas of neon (Ne), xenon (Xe), and the like is sealed as a discharge gas in the discharge space under a pressure of 55 kPa to 80 kPa.

The discharge space is partitioned into a plurality of sections by the partition walls 34, and discharge cells 36 are formed in respective portions where the display electrode pairs 24 and the address electrodes 32 cross each other. When a discharge voltage is applied between the electrodes, discharge occurs in the discharge cells 36, and respective phosphors of the red phosphor layers 35R, the green phosphor layers 35G, and the blue phosphor layers 35B are excited with ultraviolet rays generated by the discharge to emit light, with the result that a color image is displayed. Note that the structure of the PDP 10 is not limited to the above-mentioned structure. For example, in the PDP 10 of the present embodiment, although the structure in which the partition wall 34 has a shape extending in one direction along the address electrodes 32 is illustrated, the partition wall 34 may have a curb-like structure having side partition walls that are low, corresponding to the display electrode pairs 24.

In the PDP 10 serving as a light-emitting device described in the present embodiment, for example, at least any one of the red phosphor layer 35R and the blue phosphor layer 35B contains rare earth phosphovanadate phosphors (for example, a Y(P, V)O$_4$ blue phosphor and a Y(P, V)O$_4$:Eu$^{3+}$ red phosphor). Further, in a preferred embodiment, phosphors contained in the red phosphor layer 35R include at least a rare earth phosphovanadate phosphor (for example, Y(P, V)O$_4$:Eu$^{3+}$) activated with Eu$^{3+}$. Further, in a more preferred embodiment, a rare earth phosphovanadate phosphor activated with Eu$^{3+}$ is used for all the phosphors contained in the red phosphor layer 35R.

As a red phosphor other than the rare earth phosphovanadate phosphor contained in the red phosphor layer 35R, for example, there may be given Eu$^{3+}$-activated phosphors such as Y$_2$O$_3$:Eu$^{3+}$, (Y, Gd)$_2$O$_3$:Eu$^{3+}$, and (Y, Gd)Al$_3$(BO$_3$)$_4$:Eu$^{3+}$.

As a green phosphor contained in the green phosphor layer 35G, there may be given at least one phosphor selected from the group consisting of an Mn$^{2+}$-activated phosphor, a Tb$^{3+}$-activated phosphor, a Ce$^{3+}$-activated phosphor, and an Eu$^{2+}$-activated phosphor, such as Zn$_2$SiO$_4$:Mn$^{2+}$, BaMgAl$_{10}$O$_{17}$:Mn$^{2+}$, YBO$_3$:Tb$^{3+}$, (Y, Gd)Al$_3$(BO$_3$)$_4$:Tb$^{3+}$, Y$_3$Al$_5$O$_{12}$:Ce$^{3+}$, Y$_3$(Al, Ga)$_5$O$_{12}$:Ce$^{3+}$, and Ba$_3$Si$_6$O$_{12}$N$_2$:Eu$^{2+}$.

In a PDP for a plasma display device displaying a three-dimensional image, a green phosphor having both a color tone of green light and short afterglow properties is required. From this viewpoint, it is preferred that a green phosphor be a mixed green phosphor of an Mn$^{2+}$-activated phosphor and a Ce$^{3+}$-activated phosphor or an Eu$^{2+}$-activated phosphor, for example, a mixed green phosphor obtained by combining Zn$_2$SiO$_4$:Mn$^{2+}$ with any one phosphor of Y$_3$Al$_5$O$_{12}$:Ce$^{3+}$ and Y$_3$(Al, Ga)$_5$O$_{12}$:Ce$^{3+}$.

As a blue phosphor other than the rare earth phosphovanadate phosphor contained in the blue phosphor layer 35B, there may be given an Eu$^{2+}$-activated phosphor such as BaMnInAl$_{10}$O$_{17}$:Eu$^{2+}$ and CaMgSi$_2$O$_6$:Eu$^{2+}$.

Figure 4:
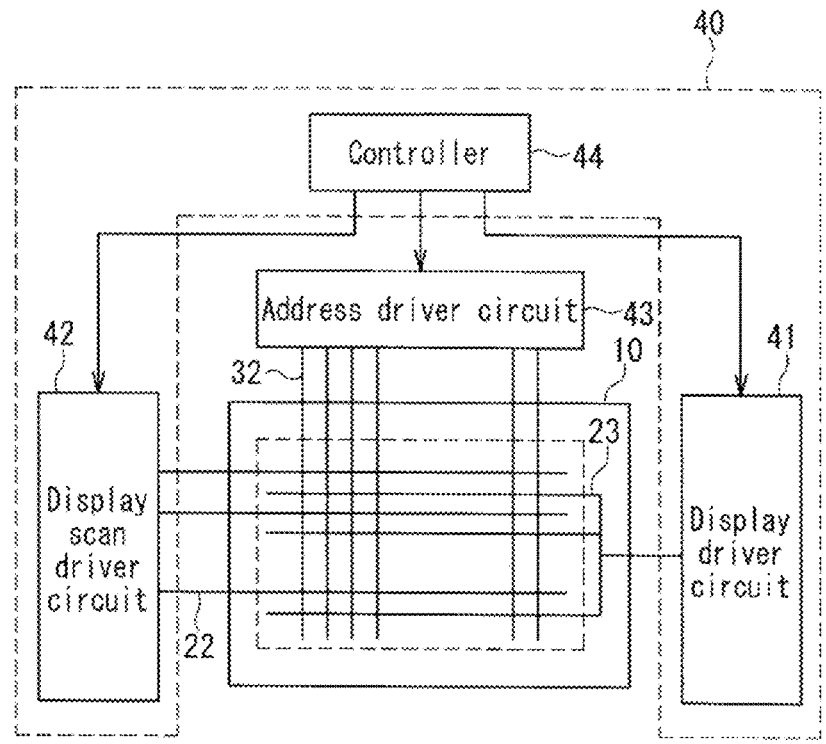
FIG. 4 is a block diagram showing a drive circuit configuration of the plasma display device.

FIG. 4 is a block diagram showing a configuration of a plasma display device using the PDP 10.

The plasma display device includes the PDP 10 and a drive circuit 40 connected to the PDP 10. The drive circuit 40 includes a display driver circuit 41, a display scan driver circuit 42, and an address driver circuit 43, and each driver circuit is connected to the sustaining electrodes 23, the scanning electrode 22, and the address electrode 32 of the PDP 10. Further, the controller 44 controls a drive voltage to be applied to various electrodes.

Next, an operation of discharge in the PDP 10 is described. First, address discharge is performed by applying a predetermined voltage to the scanning electrode 22 and the address electrode 32 corresponding to the discharge cell 36 to be lit. Thus, a wall charge is formed in the discharge cell 36 corresponding to display date. After that, when a sustaining discharge voltage is applied between the sustaining electrode 23 and the scanning electrode 22, sustaining discharge occurs in the discharge cell 36 in which the wall discharge has been formed, to generate ultraviolet rays. The phosphors in the red phosphor layer 35R, the green phosphor layer 35G, and the blue phosphor layer 35B excited with the ultraviolet rays emit light, whereby the discharge cell 36 is lit. An image is displayed based on a combination of lighting and non-lighting of the discharge cell 36 of each color.

Figure 5:
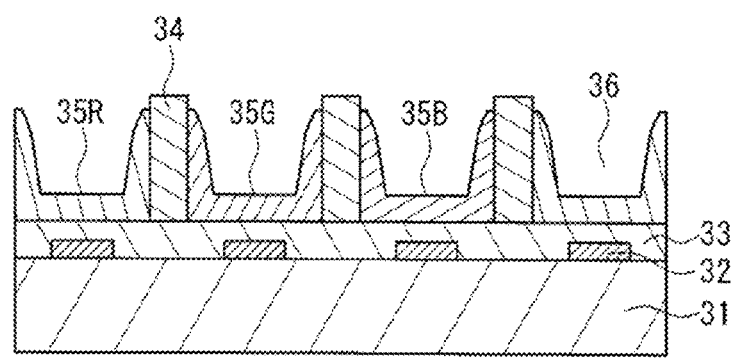
FIG. 5 is a cross-sectional view showing the configuration of the PDP.

Next, a structure and a production method of the back plate 30 of the PDP 10 according to the present embodiment are described with reference to FIG. 5. FIG. 5 is a cross-sectional view showing a configuration of the back plate 30 of the PDP 10 in the present embodiment.

A silver paste for an electrode is applied to the back glass substrate 31 by screen printing and fired to form a plurality of address electrodes 32 in a stripe shape. A paste containing a glass material is applied so as to cover the address electrodes 32 by a die coater method or screen printing and fired to form the underlying dielectric layer 33.

The partition walls 34 are formed on the underlying dielectric layer 33 thus formed. As a method for forming the partition walls 34, there may be given a method for repeatedly applying a paste containing a glass material in a stripe shape, with each address electrode 32 interposed, by screen printing and firing the paste. There is also a method for applying a paste to the underlying dielectric layer 33 so as to cover the address electrodes 32, and patterning and firing the paste. The discharge space is partitioned by the partition walls 34 to form the discharge cells 36. A gap of the partition wall 34 is set to 130 μm to 240 μm in accordance with, for example, a 42 to 50-inch full HD television or an HD television.

Pastes containing particles of respective phosphor materials are applied to grooves between the adjacent two partition walls 34 by screen printing or an inkjet method and fired, whereby the red phosphor layer 35R, the green phosphor layer 35G, and the blue phosphor layer 35B are formed.

The back plate 30 thus produced and the front plate 20 on which the display electrode pairs 24, the dielectric layer 25, and the protective layer 26 are formed are opposed and layered so that the scanning electrodes of the front plate 20 and the address electrodes 32 of the back plate 30 are orthogonal to each other, and sealing glass is applied to an outer periphery thereof to seal the front plate 20 and the back plate 30. Then, a discharge space is exhausted temporarily to high vacuum, and thereafter, a mixed gas of neon (Ne), xenon (Xe), and the like is sealed in the discharge space under a pressure of 55 kPa to 80 kPa to produce the PDP 10 according to the present embodiment.

The drive circuit 40 is connected to the PDP 10 thus produced and the resultant PDP 10 is further arranged in a housing or the like to obtain a plasma display device.

Figure 6A:
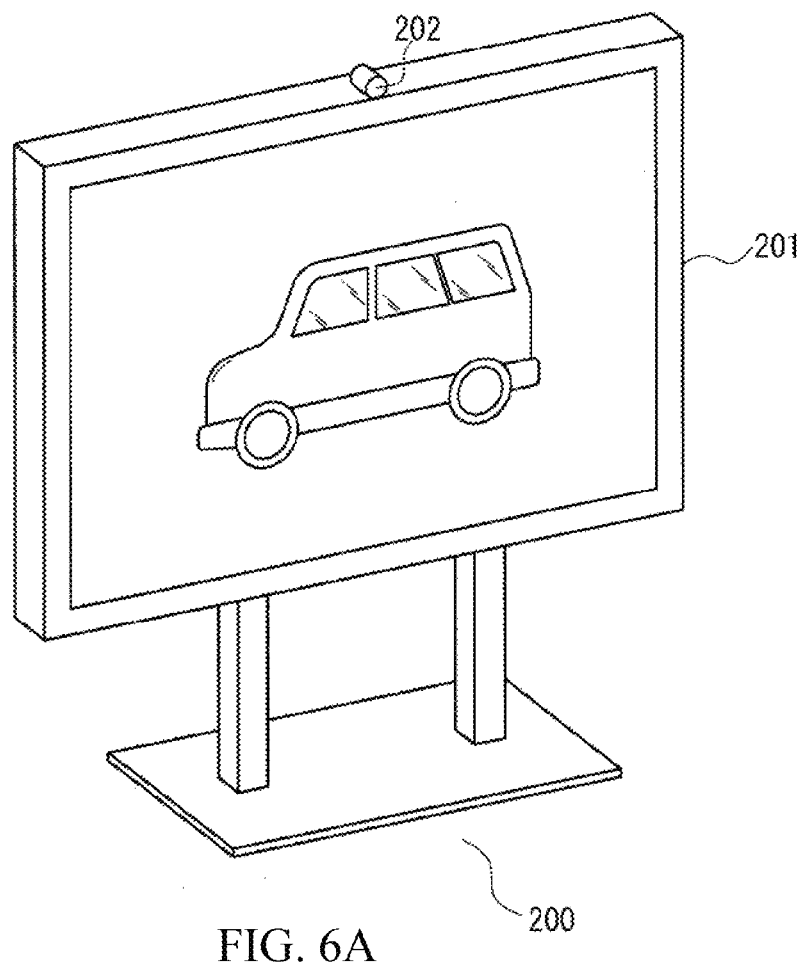
FIG. 6A and FIG. 6B are perspective views showing examples of a three-dimensional image display apparatus using the plasma display device.
Figure 6B:
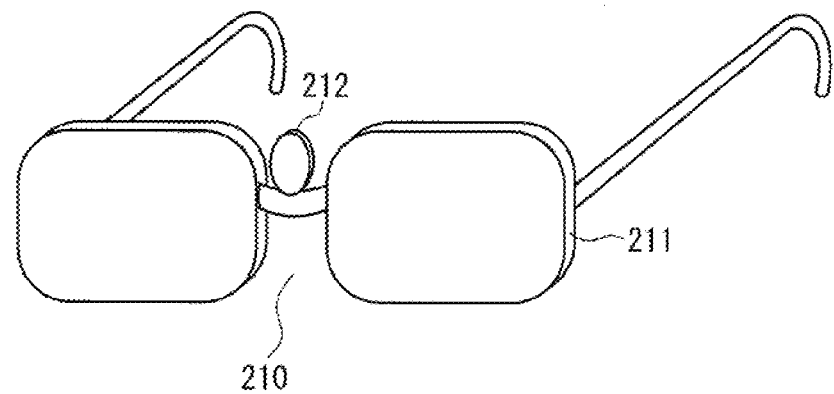

Next, the case is described where the plasma display device 201 having the PDP described above as a display panel is applied to a three-dimensional image display device 200. FIG. 6(a) is a perspective view showing an example of the three-dimensional image display device 200 using the plasma display device 201. A viewer can view a video displayed on a display screen of the three-dimensional image display device 200 as a three-dimensional video by watching the video through eyeglasses for viewing a video 210 whose perspective view is shown in FIG. 6(b).

That is, the three-dimensional display device 200 displays a video for a left eye and a video for a right eye alternately on the display screen. The eyeglasses for viewing a video 210 control light entering the left eye and light entering the right eye of the eyeglasses for viewing a video 210 with a liquid crystal shutter serving as an optical filter, in synchronization with a video output to the display screen of the three-dimensional image display device 200.

A video subjected to a predetermined processing of a three-dimensional video (3D video) is displayed on the display screen of the three-dimensional image display device 200, with the video for the left eye and the video for the right eye being different by a parallax. The viewer can detect a parallax from the videos viewed by the right and left eyes and can perceive visually that the video displayed by the three-dimensional image display device 200 is a three-dimensional video.

A synchronization signal transmitting portion 202 of the three-dimensional image display device 200 transmits a signal synchronized with a video output to the display screen of the plasma display device 201, and a synchronization signal receiving portion 212 of the eyeglasses for viewing a video 210 receives the signal. The eyeglasses for viewing a video 210 subjects light entering the right and left eyes to a predetermined optical processing based on the synchronization signal. Thus, the viewer wearing the eyeglasses for viewing a video 210 can view the video displayed by the three-dimensional image display device 200 as a three-dimensional video.

In the case where the eyeglasses for viewing a video 210 include a liquid crystal shutter 211, an infrared emitter can be used as the synchronization signal transmitting portion 202 of the three-dimensional image display device 200, and an infrared sensor can be used as the synchronization signal receiving portion 212 of the eyeglasses for viewing a video 210.

That is, the three-dimensional image display device 200 in the present embodiment is formed of a combination of the plasma display device 201 and the eyeglasses for viewing a video 210 using the liquid crystal shutter 211 that is opened or closed with a frequency of 120 Hz.

Thus, in a three-dimensional image displayed by the three-dimensional display device 200, it is necessary to prevent crosstalk that is a phenomenon in which an image is viewed as a doubled image even when the liquid crystal shutter is opened or closed with a frequency of 120 Hz. Therefore, if the afterglow time of light emitted from the phosphor of each color of the PDP is 3.5 msec or less, in particular, 3.0 msec or less, a three-dimensional image display friendly to eyes can be performed, and further, a more powerful three-dimensional video can be viewed.

The plasma display device described in the present embodiment is configured through use of a rare earth phosphovanadate phosphor exhibiting high emission characteristics, in particular, a short afterglow rare earth phosphovanadate red phosphor activated with $Eu^{3+}$, and the rare earth phosphovanadate red phosphor activated with $Eu^{3+}$ emits red light satisfactory from the viewpoint of red color purity and functions as a phosphor also excellent in short afterglow properties. In particular, a rare earth phosphovanadate red phosphor activated with $Eu^{3+}$ having a relatively high phosphorus ratio is a phosphor that satisfies both the stability and the characteristics in which luminance is higher and no luminance is saturated. Further, a small particle type rare earth phosphovanadate red phosphor activated with $Eu^{3+}$ having a relatively large BET value includes a red phosphor layer that is reduced in thickness so that a discharge space in a discharge cell becomes large, and hence, efficiency of generating ultraviolet rays (vacuum ultraviolet rays) by discharge is enhanced, and ultraviolet rays are provided with high output. As a result, red light emitted by a red pixel is provided with high output, and thereby, a plasma display device emitting red light having high luminance is obtained.

Therefore, by using the rare earth phosphovanadate red phosphor in the present disclosure, a PDP is realized that can be used preferably in a plasma display device for displaying a three-dimensional video that is preferred from the viewpoint of luminance of a red pixel and reliability and that is excellent in long life and low power consumption, with the result that a PDP capable of performing a three-dimensional display satisfying short afterglow properties, a satisfactory color tone of a red pixel, stability, and high luminance can be provided.

Note that it is apparent for those skilled in the art that the rare earth phosphovanadate phosphor in the present disclosure can be widely used in a phosphor layer serving as a light-emitting layer of a light-emitting device other than the PDP used in the plasma display device and can provide a light-emitting device having satisfactory characteristics particularly from the viewpoint of emission intensity.

EXAMPLES

Hereinafter, regarding specific examples of the rare earth phosphovanadate phosphor in the present disclosure, the characteristics of the rare earth phosphovanadate phosphor are described together with the production method thereof.

Note that, in the following respective examples, a general YPV red phosphor was selected as a specific example of a rare earth phosphovanadate phosphor to be generated.

Examples 1 to 4

First, YPV red phosphors of Examples 1 to 4 were generated with a phosphor composition represented by a chemical formula: $(Y_{0.92}Eu_{0.08})(P_{0.67}V_{0.33})O_4$ being a production target.

As materials for the YPV red phosphors of Examples 1 to 4, the following chemical powder was used.

$(Y_{0.92}Eu_{0.08})_2O_3$ coprecipitate having a purity of 3 N or more, manufactured by Shinetsu Chemical Co., Ltd.

Diammonium phosphate $((NH_4)_2HPO_4)$ having a purity of 2 N or more, manufactured by Wako Pure Chemical Industries, Ltd.

Vanadium pentoxide $(V_2O_5)$ having a purity of 4 N, manufactured by Kojundo Chemical Laboratory Co., Ltd.

Potassium carbonate $(K_2CO_3)$ having a purity of 2N5, manufactured by Kanto Chemical Co., Ltd.

The above-mentioned compound materials were weighed so that a mixture of $(Y_{0.92}Eu_{0.08})(P_{0.67}V_{0.33})O_4$ and $KVO_3$ (mixture of a rare earth phosphovanadate phosphor and an alkali metal vanadate) in a molar ratio of 1:x was generated by a reaction. Specific weighing ratios of respective materials in Examples 1 to 4 are as shown in Table 1.

TABLE 1

|  | x | $(Y_{0.92}Eu_{0.08})_2O_3$ | $(NH_4)_2HPO_4$ | $V_2O_5$ | $K_2CO_3$ |
| --- | --- | --- | --- | --- | --- |
| Example 1 | 0.1 | 59.47 g | 44.24 g | 19.62 g | 3.46 g |
| Example 2 | 0.2 | 59.47 g | 44.24 g | 24.19 g | 6.91 g |
| Example 3 | 1 | 23.79 g | 17.70 g | 24.28 g | 13.82 g |
| Example 4 | 10 | 5.95 g | 4.42 g | 47.17 g | 34.55 g |

These materials were subjected to wet mixing (kneading) sufficiently together with an appropriate amount of water (pure water) through use of a motor grinder.

The kneaded mixed material was transferred to an alumina container and dried at 120° C. overnight through use of a dryer.

The dried mixed material was roughly crushed through use of a mortar and a pestle, and thereafter, sufficiently crushed through use of a mortar grinder to obtain a firing material.

The firing material was transferred to an alumina crucible with a lid and fired at 1,200° C. for 2 hours in the atmosphere through use of a box-type electric furnace to obtain a fired body. The fired body thus obtained exhibited a parti-colored pattern of a white portion and an orange portion or exhibited a red-purplish brown body color, and in particular, when x=10, a red-purplish brown fired body was melted in a crucible bottom. From the foregoing, it was not expected from an outer appearance of the fired body that a high-efficiency phosphor is to be obtained. Further, as described later, the obtained fired body was a mixture in which at least a $Y(P, V)O_4:Eu^{3+}$ red phosphor and $KVO_3$ were mixed.

Next, the fired body thus obtained was roughly crushed through use of a mortar and a pestle. The above-mentioned parti-colored pattern of the fired body was eliminated by the rough crushing, whereby whitish orange powder (in the case of x<1) or red-purplish brown crushed material (in the case of x≥1) was obtained.

After that, an aftertreatment mainly involving the steps of water crushing, classification, an acid treatment, an alkaline treatment, water washing, and drying were performed.

Hereinafter, the procedure of the aftertreatment is described.

First, a fired body after rough crushing (powder to crushed material, about 5 g) was subjected to a pulverizing treatment (water crushing) for 30 minutes through use of a ball mill using pure water as a solvent.

An alkali metal vanadate component in the fired body was dissolved in the pure water by the water crushing to obtain a pale yellow suspension. Note that the suspension was caused to pass through a 250-mesh sieve for the purpose of removing coarse particles, and mesh residues of coarse particles were hardly recognized. This shows that, a rare earth phosphovanadate phosphor can be produced with high production yield by the production technology described in Example 1.

The suspension having passed through the sieve was suction-filtered through use of a Büchner funnel in which filter paper was set and a suction filter to be separated into an alkali metal vanadate aqueous solution and a rare earth phosphovanadate phosphor particle group constituting the suspension, and a rare earth phosphovanadate phosphor was extracted.

The extracted rare earth phosphovanadate phosphor was dried at 120° C. for several hours in the atmosphere through use of a dryer, and thereafter, the dried rare earth phosphovanadate phosphor (2 to 3 g) was subjected to acid washing with 2N dilute hydrochloric acid (50 ml) through use of a beaker and a stirrer.

The rare earth phosphovanadate phosphor after acid washing was subjected to washing by filtration (water washing) with pure water through use of the Büchner funnel in which filter paper was set and a suction filter, temporarily dried in the same way as above, and subjected to alkali washing with 2% by weight of an ammonium carbonate aqueous solution (50 ml) again through use of a beaker and a stirrer.

The rare earth phosphovanadate phosphor after the alkali washing was washed with water in the same way as in the above and dried to obtain the rare earth phosphovanadate phosphor in the present disclosure.

FIGS. 7(a) to 7(d) are electron micrographs magnified by 10,000 times of the rare earth phosphovanadate phosphors of Examples 1 to 4 thus produced. FIG. 7(e) shows the YPV phosphor of Example 1; FIG. 7(b) shows the YPV phosphor of Example 2; FIG. 7(c) shows the VPV phosphor of Example 3; and FIG. 7(d) shows the YPV phosphor of Example 4.

For reference, FIG. 7(e) also shows an example of an electron micrograph of a commercially available YPV phosphor for a PDP that is to have substantially the same composition (Eu substitution amount: 8 atomic %; phosphorus ratio 67 atomic %) as Comparative Example 1.

As shown in FIGS. 7(a) to 7(d), each of the rare earth phosphovanadate phosphors of Examples 1 to 4 is a particle group of aggregated primary particles, and the particle group contains at least primary particles on the surface of which a linear uneven pattern including a plurality of ridge lines parallel to each other is formed, although there is a variation in degree.

The characteristic linear uneven pattern is considered as a mark that is formed while the potassium compound ($KVO_3$)) generated as impurities is removed by water washing, and as described later, such a linear uneven pattern is not observed in rare earth phosphovanadate phosphors and the like produced by the conventional production method.

Figure 8:
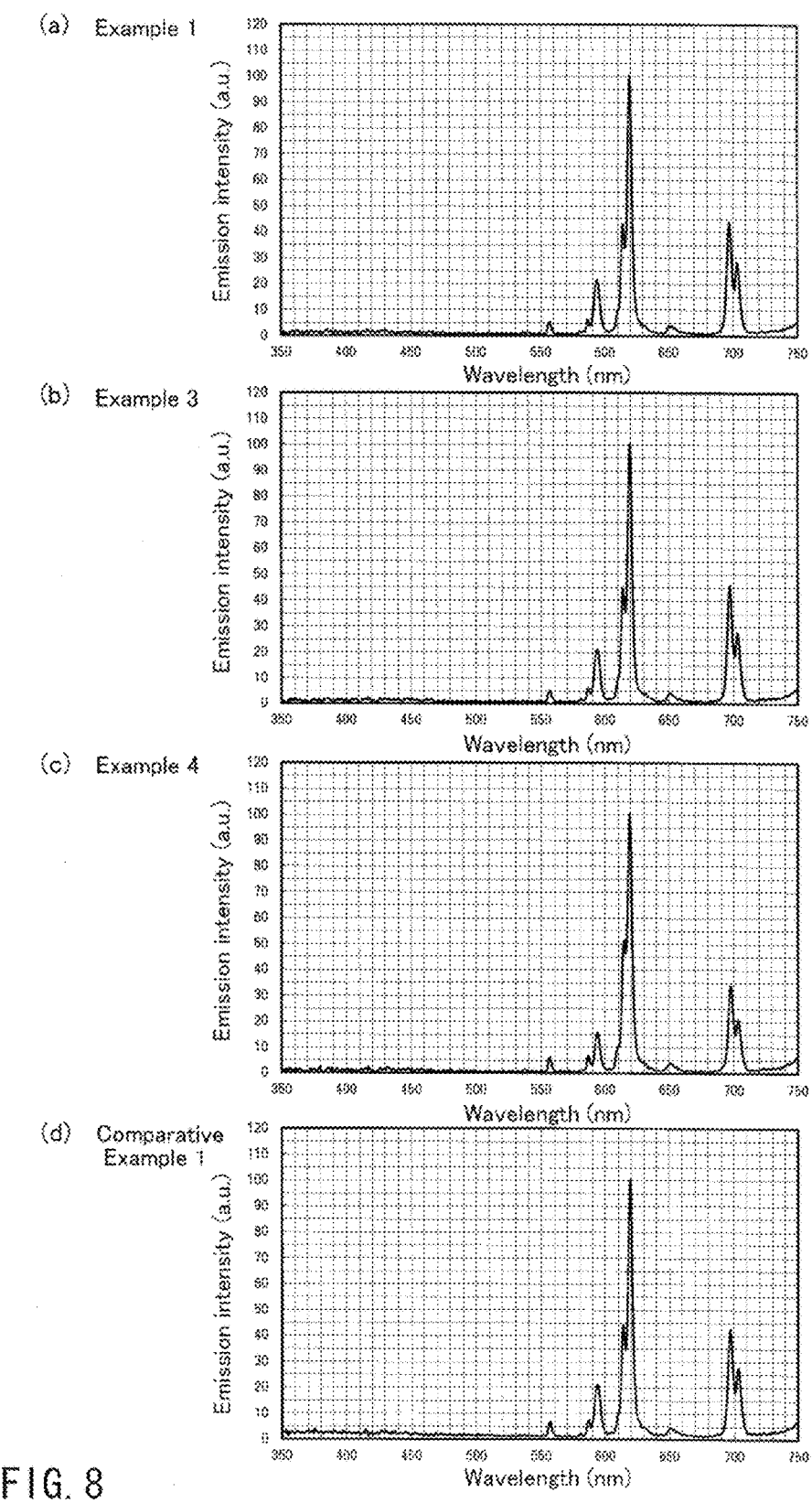
FIG. 8 is graphs showing emission spectra of the rare earth phosphovanadate phosphors according to the examples and the comparative example.

FIG. 8 shows emission spectra of red light recognized when the YPV red phosphors of the examples and the YPV red phosphor of the comparative example are irradiated with vacuum ultraviolet rays.

FIG. 8(a) shows an emission spectrum of the YPV red phosphor of Example 1,

FIG. 8(b) shows an emission spectrum of the YPV red phosphor of Example 3, FIG. 8(c) shows an emission spectrum of the YPV red phosphor of Example 4, and FIG. 8(d) shows an emission spectrum of the YPV red phosphor of Comparative Example 1 that is to have substantially the same composition as the above. Note that the phosphors were irradiated with the vacuum ultraviolet rays having a peak wavelength of 146 nm through use of an excimer lamp (manufactured by Ushio Inc.). In FIGS. 8(a) to 8(d), peaks observed in the vicinity of 557 nm and 587 nm indicate light leakage of the excimer lamp, and hence, are not considered as emission spectra of the YPV red phosphor.

As is understood from FIGS. 8(a) to 8(d), light emitted by the YPV red phosphors of Examples 1, 3, and 4 was red light of satisfactory red color purity having an emission peak in the vicinity of 619 to 620 nm in the same way as in light emitted by the YPV red phosphor of Comparative Example 1.

This suggests that YPV red phosphors having a composition close to $(Y_{0.92}Eu_{0.08})(P_{0.67}V_{0.33})O_4$ as a production target were produced as the phosphors of Examples 1 to 4.

Figure 9:
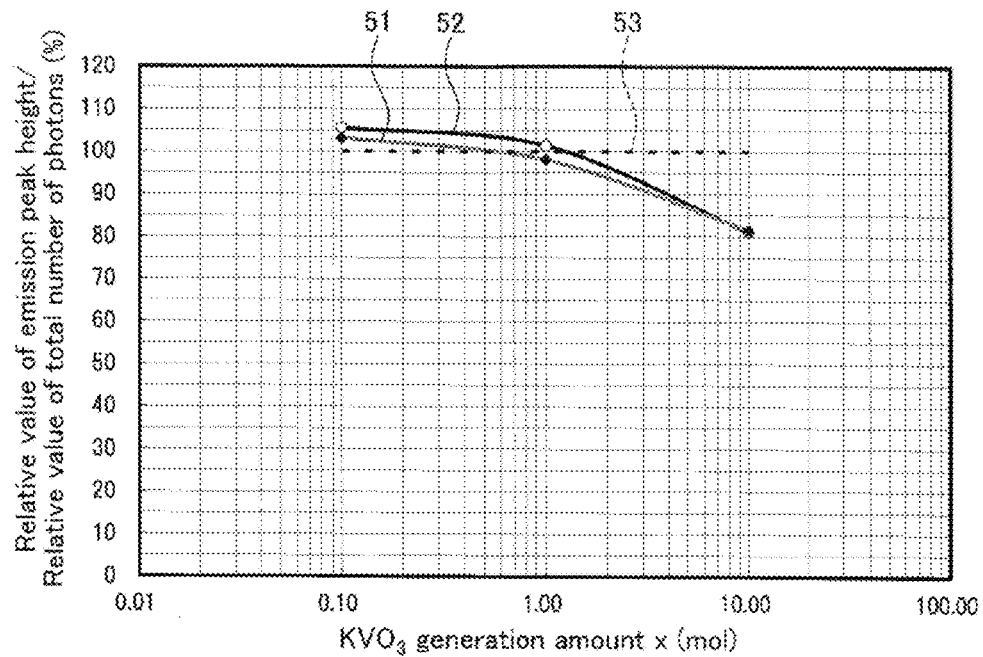
FIG. 9 is a graph showing a relationship between the $KVO_3$ generation amount and the emission characteristics in the rare earth phosphovanadate phosphors according to the examples.

FIG. 9 shows a relationship between the emission peak height and the total number of photons of red light obtained under a 146 nm excitation condition, and the molar ratio "x" of a $KVO_3$ generation amount with respect to $(Y_{0.92}Eu_{0.08})(P_{0.67}V_{0.33})O_4$ as a production target in the stage of the fired body before the aftertreatment, in the YPV red phosphors after the aftertreatment obtained as Examples 1 to 4. The values are relative numerical values with respect to the value of the commercially available YPV red phosphor for a PDP of Comparative Example 1.

In FIG. 9, a solid line 51 corresponds to an emission peak height, and a solid line 52 corresponds to the total number of photons, both of them indicating values with the numerical values of Comparative Example 1 indicated by a dotted line 53 being 100%. Further, the $KVO_3$ generation amount "x" of 0.10 mol corresponds to a measured value of Example 1; the $KVO_3$ generation amount "x" of 1.00 mol corresponds to a measured value of Example 3; and the $KVO_3$ generation amount "x" of 10.0 mol corresponds to a measured value of Example 4. Note that the values of the total number of photons were obtained by calculation from emission spectrum data for each 1 nm in a wavelength range of 350 nm to 730 nm.

As shown in FIG. 9, it was confirmed that the YPV red phosphor of Example 1 exhibited an emission peak height at a level of 103% and the total number of photons at a level of 105% compared with the numerical values obtained in Comparative Example 1 and had emission characteristics of 100% or more compared with those of the YPV red phosphor of Comparative Example 1. In FIG. 9, it is recognized that emission characteristics decrease along with an increase in value of a molar ratio "x" of the $KVO_3$ generation amount. The phenomenon in which the emission characteristics decrease is considered to be caused as follows: a minute change in shape of emission spectra shown in FIG. 8 suggests a decrease in phosphorus ratio along with an increase in the value of x; and hence, a decrease in emission efficiency under the excitation of vacuum ultraviolet rays caused by a small phosphorus ratio influences emission characteristics. Therefore, in order to precisely evaluate emission characteristics exhibited by the YPV red phosphors of Examples 3 and 4, it is necessary to compare the emission characteristics with those of a comparative example having an equivalent phosphor composition, in particular, phosphorus ratio, instead of Comparative Example 1.

Figure 10:
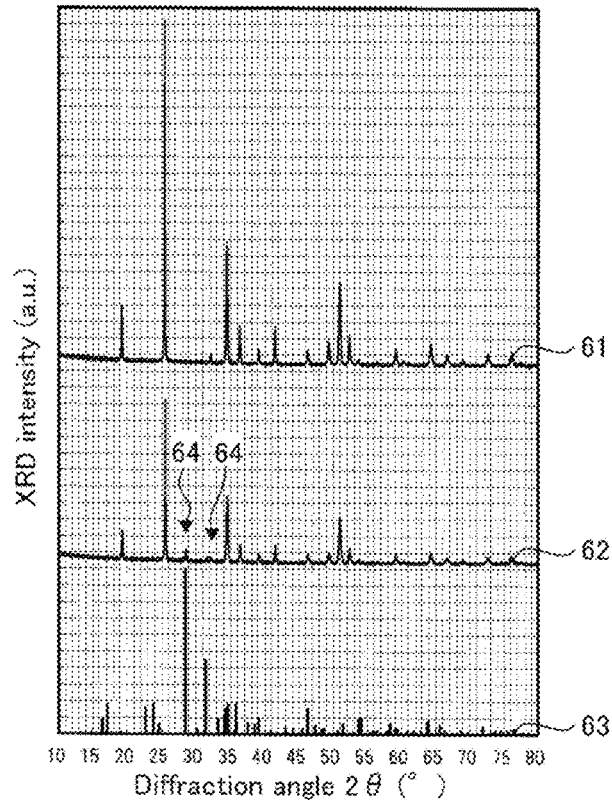
FIG. 10 is a graph showing X-ray diffraction patterns of the rare earth phosphovanadate phosphor.

FIG. 10 shows XRD patterns regarding the YPV red phosphor of Example 2.

In FIG. 10, reference numeral 61 indicates an XRD pattern of the completed YPV red phosphor of Example 2 after the aftertreatment, and reference numeral 62 indicates an XRD pattern of the YPV red phosphor in a state of a fired body before the aftertreatment in the production method described above. Further, for reference, in FIG. 10, reference numeral 63 indicates an XRD pattern of a $KVO_3$ compound. The XRD pattern is a pattern of a $KVO_3$ compound (No. 33-1052) registered in a power diffraction file (PDF).

Even when compared with the XRD pattern of the YPV red phosphor of Comparative Example 1 (not shown) and a pattern of the $YVO_4$ compound (No. 16-0250) registered in the PDF or the $YPO_4$ compound (No. 11-0254), the XRD pattern 61 of the YPV red phosphor of Example 2 shown in FIG. 10 has peaks at close positions and a suitable number of peaks with the respective peaks having similar intensity ratios, which indicates that the YPV red phosphor of Example 2 is a $(Y, Eu)(P, V)_4$ compound of a substantially single crystal phase.

Further, marks "▼" 64 shown in the XRD pattern 62 of the compound in the stage of the fired body before the aftertreatment in FIG. 10 indicate XRD peaks of portions corresponding to main peaks in the XRD pattern 63 of the $KVO_3$ compound.

As is understood from the comparison between the XRD pattern 62 in the stage of the fired body before the aftertreatment, and the XRD pattern 61 of the YPV red phosphor of Example 2, and the XRD pattern 63 of the $KVO_3$ compound in FIG. 10, the XRD pattern 62 in the stage of the fired body before the aftertreatment is a synthetic pattern of the patterns 61 and 63, and the compound in the stage of the fired body before the aftertreatment showing the XRD pattern as reference numeral 62 in FIG. 10 is a mixture of the $(Y, Eu)(P, V)_4$ compound and the $KVO_3$ compound.

In other words, this shows the following: in the method for producing a YPV red phosphor of the present embodiment, the $KVO_3$ compound in the fired body or a potassium compound similar to the $KVO_3$ compound in the fired body (for example, an alkali metal vanadate such as $K(P, V)O_4$, in particular, an alkali metal metavanadate) is removed by washing in the aftertreatment to obtain only the $(Y, Eu)(P, V)O_4$ compound, that is, the YPV red phosphor.

It can be considered from the analysis of the XRD patterns shown in FIG. 10 that the $KVO_3$ compound in the fired body has been almost completely removed by washing after water crushing. Further, in FIG. 10, although only the XRD pattern of Example 2 in which x=0.2 is shown, the tendency that the XRD pattern in the stage of the fired body before the aftertreatment is a synthetic pattern of the XRD pattern of the YPV red phosphor after the aftertreatment and the XRD pattern of the $KVO_3$ compound is recognized to be common in the numerical values of "x" indicating a molar ratio in a range of about 0.1 to about 10 and is recognized in a compound of a rare earth phosphovanadate having a wide range of compositions. From this, it can be concluded that, in the method for producing a rare earth phosphovanadate phosphor in the present disclosure, the $KVO_3$ compound in the mixture generated by firing is removed easily by water washing in the aftertreatment, irrespective of a molar ratio.

Figure 7:
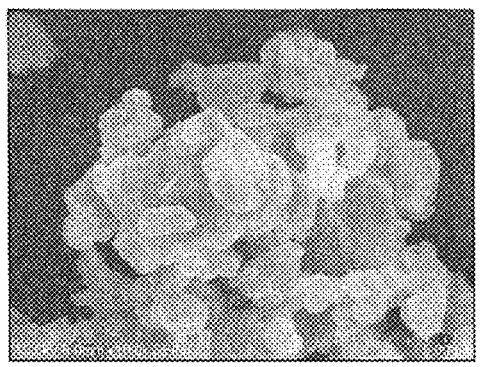
FIG. 7 is electron micrographs of rare earth phosphovanadate phosphors according to examples and a comparative example.
Figure 7:
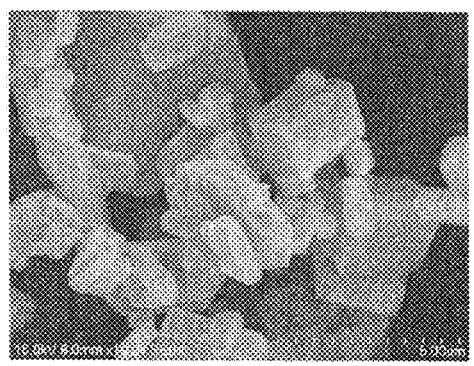
Figure 7:
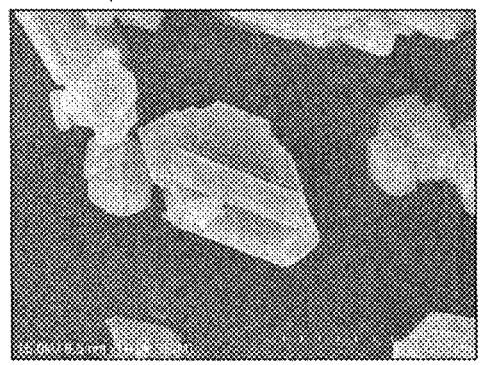
Figure 7:
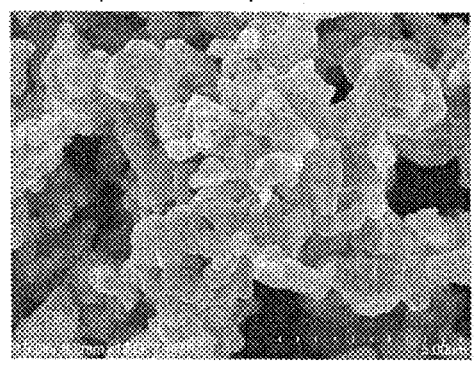
Figure 7:
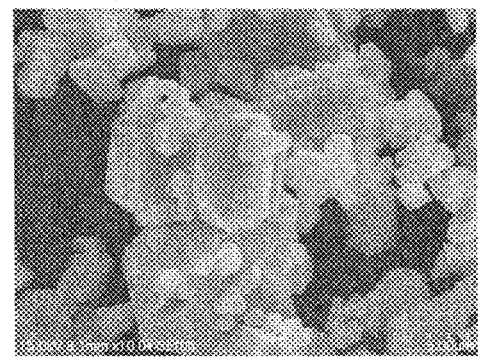

According to the method for producing a rare earth phosphovanadate phosphor in the present disclosure, the rare earth phosphovanadate phosphor is generated through such a process, and hence, a unique primary particle shape is recognized, in which removal marks of foreign matters are formed on a surface as a linear uneven pattern including a plurality of ridge lines parallel to each other, as shown in FIGS. 1, 2, and 7. Further, in general, it is known that substances to be impurities have a property of being likely to diffuse in a liquified substance and being less likely to enter crystals of the substances. For example, the melting point of the $KVO_3$ compound is 520° C., which is much lower than that of the YPV red phosphor whose melting point is 1,700° C. or more, and hence, impurities contained in the YPV red phosphor material are considered to diffuse in the $KVO_3$ compound melted during the generation of a phosphor. It is considered that as the completion of the firing step approaches, the impurities are mixed, for example, by being segregated only in the $KVO_3$ compound that is being gradually solidified. The impurities are removed by washing together with the $KVO_3$ compound by the later aftertreatment, in particular, water washing. Therefore, the impurities do not remain in a rare earth phosphovanadate phosphor to be generated, and a rare earth phosphovanadate phosphor with high efficiency excellent in crystal quality is provided.

Note that the YPV red phosphor shown in the electron micrographs of FIG. 1 is obtained by firing materials for firing prepared in the same ratio as that of Example 2 at 1,300° C.

According to the method for producing a rare earth phosphovanadate phosphor in the present disclosure, a rare earth phosphovanadate phosphor is generated through a process described as the method for producing a YPV red phosphor of Examples 1 to 4, and a rare earth phosphovanadate phosphor that has outstanding emission efficiency and that has a central particle diameter (D50) of about 1 μm to 20 μm, in particular, 2 μm to 10 μm can be provided.

Examples 5 to 9

Next, YPV red phosphors of Examples 5 to 9 were generated by a solid phase reaction through use of potassium nitrate as an alkali metal compound material, with a red phosphor represented by a chemical formula: $(Y_{0.92}Eu_{0.08})(P_{0.67}V_{0.33})O_4$ that was the same composition as that of Examples 1 to 4 being a production target.

As materials for the YPV red phosphors of Examples 5 to 9, the following compound powder was used.

For selecting materials for generating the YPV red phosphors of Examples 5 to 9, materials inferior to those used for generating the YPV red phosphors of Examples 1 to 4 in terms of purity were selected, considering the reduction in production cost to some degree.

$(Y_{0.92}Eu_{0.08})_2O_3$ coprecipitate having a purity of 3 N or more, manufactured by Shinetsu Chemical Co., Ltd.

Diammonium phosphate $((NH_4)_2HPO_4)$ having a purity of 2 N or more, manufactured by Wako Pure Chemical Industries, Ltd.

Vanadium pentoxide $(V_2O_5)$ having a purity of 2 N, manufactured by Kanto Chemical Co., Ltd.

Potassium nitrate $(KNO_3)$ having a purity of 2 Nup, manufactured by Kojundo Chemical Laboratory Co., Ltd.

The above-mentioned compound materials were weighed so that a mixture of $(Y_{0.92}Eu_{0.08})(P_{0.67}V_{0.33})O_4$ and $KVO_3$ in a molar ratio of 1:x was generated by a reaction in the same way as in Examples 1 to 4. Specific weighing ratios of respective materials in Examples 5 to 9 are as shown in Table 2. Further, Table 2 also shows weighing ratios of respective materials used for generating the YPV red phosphor in which x=0, using no potassium compound, produced as Comparative Example 2.

TABLE 2

|  | x | $(Y_{0.92}Eu_{0.08})_2O_3$ | $(NH_4)_2HPO_4$ | $V_2O_5$ | $KCO_3$ |
|---|---|---|---|---|---|
| Example 5 | 0.03 | 59.47 g | 44.24 g | 16.43 g | 1.52 g |
| Example 6 | 0.1 | 59.47 g | 44.24 g | 19.62 g | 5.06 g |
| Example 7 | 0.3 | 59.47 g | 44.24 g | 28.75 g | 15.17 g |
| Example 8 | 1 | 23.79 g | 17.70 g | 24.28 g | 20.22 g |
| Example 9 | 3 | 23.79 g | 17.70 g | 60.79 g | 60.66 g |
| Comparative Example 2 | 0 | 59.47 g | 44.24 g | 15.06 g | 0.00 g |

In the same way as in the production conditions of Examples 1 to 4, these materials were kneaded, dried, and crushed to obtain a firing material, and the firing material was transferred to a firing container and fired at 1,300° C. for 2 hours in the atmosphere through use of an electric furnace to obtain a fired body.

After that, the fired body was subjected to an aftertreatment (a series of treatments including rough crushing, water crushing, classification, water washing, filtration, acid washing, alkali washing, water washing, and drying) in the same procedure as that of Examples 1 to 4, whereby rare earth phosphovanadate phosphors of Examples 5 to 9 and Comparative Example 2 were obtained.

Figure 11:
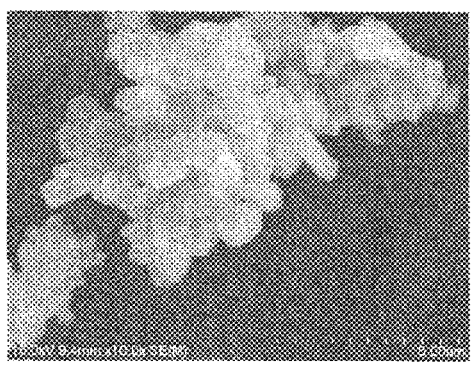
FIG. 11 is electron micrographs of rare earth phosphovanadate phosphors according to examples and a comparative example.
Figure 11:
Figure 11:
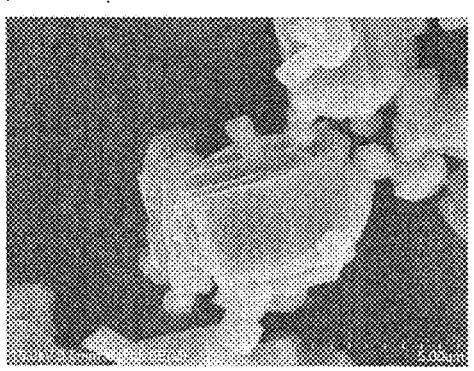
Figure 11:
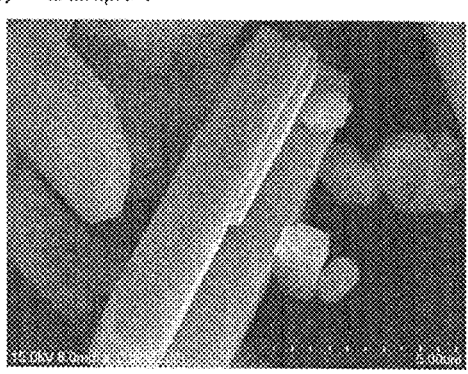
Figure 11:
Figure 11:
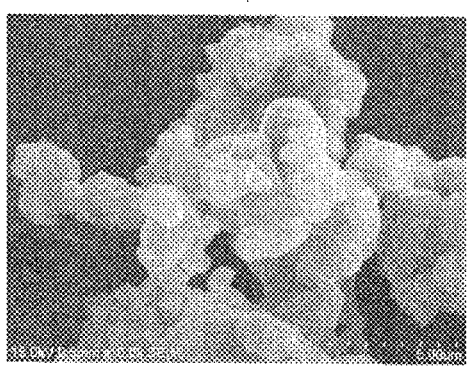

FIGS. 11(a) to 11(e) are electron micrographs magnified by 10,000 times of the rare earth phosphovanadate phosphors thus produced. FIG. 11(a) shows the YPV phosphor of Example 5; FIG. 11(b) shows the YPV phosphor of Example 6; FIG. 11(c) shows the YPV phosphor of Example 7; FIG. 11(d) shows the YPV phosphor of Example 8; and FIG. 11(e) shows the YPV phosphor of Example 9.

For reference, FIG. 11(f) shows an electron micrograph of the YPV phosphor of Comparative Example 2.

As shown in FIGS. 11(b) to 11(e), each of the rare earth phosphovanadate phosphors of Examples 6 to 9 is a particle group of aggregated primary particles, and the particle group contains at least primary particles on the surface of which a linear uneven pattern including a plurality of ridge lines parallel to each other is formed.

In the same way as in Examples 1 to 4, the linear uneven patterns appearing in FIGS. 11(b) to 11(e) are considered as marks that are formed while the potassium compound $(KVO_3)$ generated as impurities is removed by water washing. As described later, such linear uneven patterns are not observed in rare earth phosphovanadate phosphors produced by the conventional production method.

It also was confirmed that an outer appearance to be a base of primary particles can take various shapes such as a cubic shape, a columnar shape, or a bar shape, depending on the numerical value of "x", as is understood from the micrographs of FIGS. 11(b) to 11(e).

Further, as shown in FIG. 11(a), in the case where the generation amount "x" of the potassium compound $(KVO_3)$ is as small as 0.03, it is difficult to confirm the unique linear uneven pattern on the surface of a primary particle. This can be easily understood considering that the linear uneven pattern is caused by a mark formed along with the removal of the potassium compound by water washing. Thus, a rare earth phosphovanadate phosphor obtained by the method for producing a rare earth phosphovanadate phosphor in the present disclosure, that is, a method involving: blending phosphor materials so that a mixture of a rare earth phosphovanadate phosphor and an alkali metal vanadate, in particular, a metavanadate is generated by firing, thereby obtaining a material mixture; reacting the material mixture thus obtained to generate a mixture of the rare earth phosphovanadate phosphor and the alkali metal vanadate as an intermediate product; and removing the alkali metal vanadate does not necessarily have a unique linear uneven pattern on a surface of a primary particle. However, in the case of generating a rare earth phosphovanadate phosphor without using an alkali metal compound, as in Comparative Example 2 shown in FIG. 11(f), a primary particle has a rounded shape having a smooth surface, and the above-mentioned unique linear uneven pattern as recognized in Examples 1 to 4 and Examples 6 to 9 is not recognized. From this, it can be considered that a rare earth phosphovanadate phosphor in which a unique linear uneven pattern including a plurality of ridge lines parallel to each other that seems to flow in one direction is formed at least on the surface of a primary particle is generated by the production method in the present disclosure.

Figure 12:
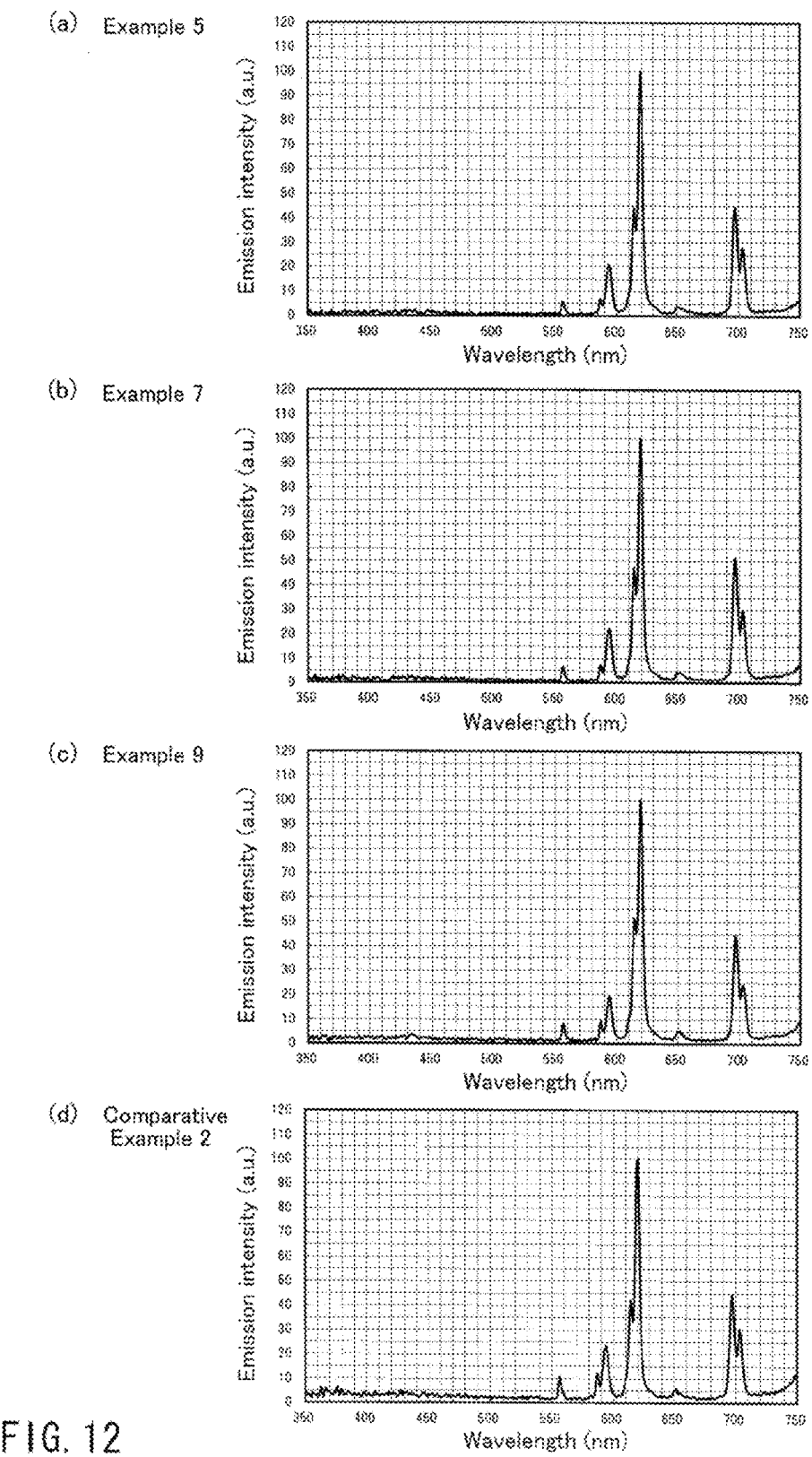
FIG. 12 is graphs showing emission spectra of the rare earth phosphovanadate phosphors according to the examples and the comparative example.

FIG. 12 shows emission spectra of red light recognized in the YPV red phosphors created as the examples of the present invention and the YPV red phosphor of the comparative example when irradiated with vacuum ultraviolet rays.

FIG. 12(a) shows an emission spectrum of the YPV red phosphor of Example 5; FIG. 12(b) shows an emission spectrum of the YPV red phosphor of Example 7; FIG. 12(c) shows an emission spectrum of the YPV red phosphor of Example 9; and FIG. 12(d) shows an emission spectrum of the YPV red phosphor of Comparative Example 2. Note that the phosphors were irradiated with vacuum ultraviolet rays having a peak wavelength of 146 nm through use of an excimer lamp (manufactured by Ushio Inc.) in the same way as in the measurement of the emission spectra shown in FIG. 8. Therefore, peaks observed in the vicinity of 557 nm and 587 nm in FIGS. 12(a) to 12(d) indicate light leakage of the excimer lamp in the same way as in each FIG. 8.

The emission spectra of the YPV red phosphors of Examples 5, 7, and 9 shown in FIG. 12 and the emission spectra of the YPV red phosphors of Examples 6 and 8 (not shown) were recognized to have emission peaks in the vicinity of 619 nm to 620 nm in the same way as in the emission spectra of the YPV red phosphors of Examples 1 to 4 described with reference to FIG. 8, and the emission spectra of the YPV red phosphors of Examples 5 to 9 also were confirmed to be red light of satisfactory red color purity in the same way as in Comparative Example 2.

This suggests that the YPV red phosphors of Examples 5 to 9 were also produced as YPV red phosphors having a composition close to $(Y_{0.92}Eu_{0.08})(P_{0.67}V_{0.33})O_4$ as a production target.

Figure 13:
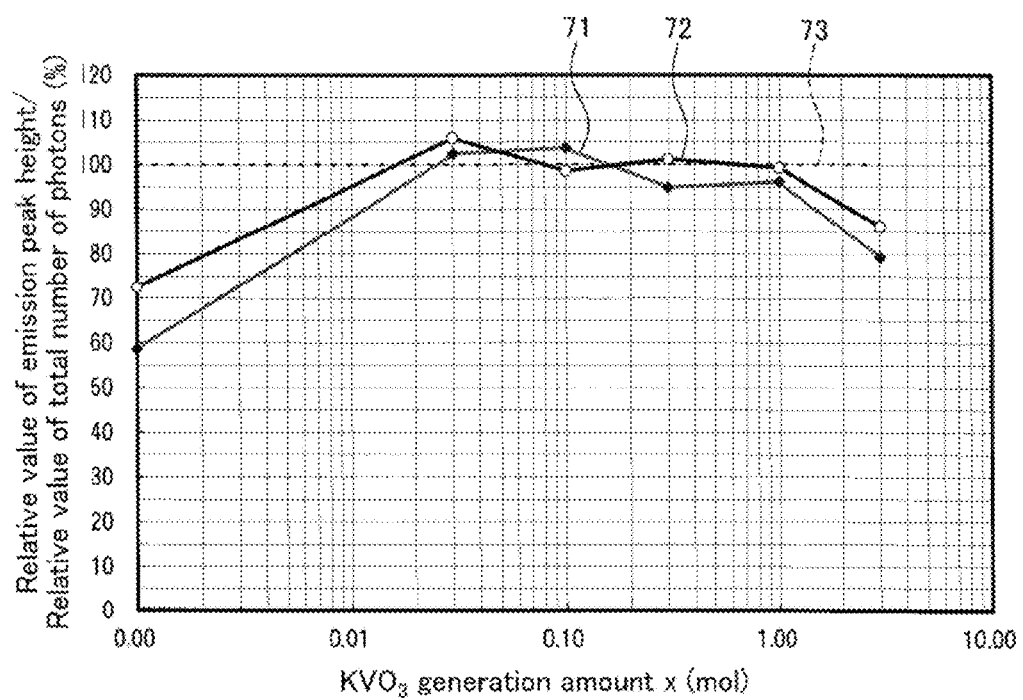
FIG. 13 is a graph showing a relationship between the $KVO_3$ generation amount and the emission characteristics in the rare earth phosphovanadate phosphors according to the examples and the comparative example.

FIG. 13 shows a relationship between the emission peak height and the total number of photons of red light obtained under a 146 nm excitation condition, and the molar ratio x of a $KVO_3$ generation amount with respect to $(Y_{0.92}Eu_{0.08})(P_{0.67}V_{0.33})O_4$ as a production target in the stage of the fired body before the aftertreatment, in the YPV red phosphors after the aftertreatment obtained as Examples 5 to 9. The values are relative numerical values with respect to the value of the commercially available YPV phosphor for a PDP of Comparative Example 1 described above. Note that, in FIG. 13, the relative values of the total number of photons were obtained by calculation from emission spectrum data for each 1 nm in a wavelength range of 350 nm to 730 nm in the same way as in the case of FIG. 9.

In FIG. 13, a solid line 71 corresponds to an emission peak height, and a solid line 72 corresponds to the total number of photons, both of them indicating relative values with the values of Comparative Example 1 indicated by a dotted line 73 being 100%. Further, the $KVO_3$ generation amount "x" of 0.03 mol corresponds to a measured value of Example 5; the $KVO_3$ generation amount "x" of 0.10 mol corresponds to a measured value of Example 6; the $KVO_3$ generation amount "x" of 0.30 mol corresponds to a mea-sured value of Example 7; the $KVO_3$ generation amount "x" of 1.00 mol corresponds to a measured value of Example 8; and the $KVO_3$ generation amount "x" of 3.00 mol corresponds to a measured value of Example 9. The emission peak height and the total number of photons of Comparative Example 2 are shown at a position of the $KVO_3$ generation amount "x" of 0.00 mol.

As shown in FIG. 13, the YPV red phosphors of Examples 5 to 9 each had higher numerical values of an emission peak height and the total number of photons and exhibited higher emission characteristics, compared with those of the YPV red phosphor (x=0) of Comparative Example 2 using no alkali metal compound. Further, at least the YPV red phosphors of Examples 5 to 8 have emission characteristics equivalent to those of the commercially available YPV red phosphor of Comparative Example 1, irrespective of the use of a phosphor material that is inexpensive and has poor purity. Further, the YPV red phosphor of Example 5 exhibited emission characteristics at a level of 102 to 105% that is equal to or more than those of Comparative Example 1.

This shows that, according to the method for producing a rare earth phosphovanadate phosphor in the present disclosure, a YPV red phosphor having emission characteristics equal to or more than those of the conventional YPV red phosphor shown as Comparative Example 1 can be produced through use of inexpensive materials. Note that, in FIG. 13, the following tendency is also recognized: the emission characteristics of the YPV red phosphors are degraded along with an increase in "x", and it is presumed from a minute change in shape of the emission spectra shown in FIG. 12 that this tendency occurs due to a decrease in emission efficiency caused by a decrease in a phosphorus ratio involved in an increase in "x". Therefore, in order to precisely evaluate the emission characteristics exhibited by the YPV red phosphors of Examples 7 to 9 having a large numerical value of "x", it is necessary to compare the emission characteristics of the YPV red phosphors of Examples 7 to 9 with those of a comparative example having an equal phosphor composition, in particular, an equal phosphorus ratio.

Although specific data is not attached, in the case where vanadium pentoxide used in Examples 5 to 9 are replaced by those having high purity, an optimum value of the $KVO_3$ generation amount that is a molar ratio "x" of $KVO_3$ with respect to $(Y_{0.92}Eu_{0.08})(P_{0.67}V_{0.33})O_4$ becomes less than 0.1 while an optimum value of firing temperature increases, the phosphors exhibit emission characteristics at a high level when "x" is in the vicinity of 0.01 or "x" is equal to or less than 0.01, and further, an absolute value of the emission characteristics to be exhibited tends to be high.

Further, although the disclosure of the XRD data in the YPV red phosphors of Examples 5 to 9 is omitted, in the same way as in the YPV red phosphors of Examples 1 to 4, it was confirmed that a fired body before aftertreatment is a mixture of the $Y(P, V)O_4:Eu^{3+}$ red phosphor and the $KVO_3$, and the $Y(P, V)O_4:Eu^{3+}$ red phosphor is extracted from the fired body by water washing, and a YPV red phosphor having high emission characteristics is obtained.

Note that, the YPV red phosphor whose electron micrographs are shown in FIG. 2 is obtained by firing materials for firing prepared in the same ratio as that of Example 8 at 1,200° C.

Examples 10 to 12

Next, YPV red phosphors of Examples 10 to 12 were produced by a solid phase reaction through use of potassium metavanadate as alkali metal compound materials, with a red phosphor represented by a composition: $(Y_{0.92}Eu_{0.08})(P_{0.67}V_{0.33})O_4$ being a production target in the same way as in Examples 1 to 4. The YPV red phosphors of Examples 10 to 12 were produced by a method for generating a rare earth phosphovanadate phosphor and an alkali metal vanadate separately and mixing them to obtain a mixture of the rare earth phosphovanadate phosphor and the alkali metal vanadate.

In Examples 10 to 12, the following materials were used.

$(Y_{0.92}Eu_{0.08})_2O_3$ coprecipitate having a purity of 3 N or more, manufactured by Shinetsu Chemical Co., Ltd.

Diammonium phosphate $((NH_4)_2HPO_4)$ having a purity of 2 N or more, manufactured by Wako Pure Chemical Industries, Ltd.

Vanadium pentoxide $(V_2O_5)$ having a purity of 4 N, manufactured by Kojundo Chemical Laboratory Co., Ltd.

Potassium carbonate $(K_2CO_3)$ having a purity of 2N5, manufactured by Kanto Chemical Co., Ltd.

First, a material in process of a YPV red phosphor that is to have a composition: $(Y_{0.92}Eu_{0.08})(P_{0.67}V_{0.33})O_4$ (hereinafter, referred to as "YPV material in process") and $KVO_3$ produced by the inventors of the present invention (hereinafter, referred to as "$KVO_3$ own product") were produced.

Specific weighing ratios during the production of the YPV material in process and the $KVO_3$ own product are as shown in Table 3.

TABLE 3

| | $(Y_{0.92}Eu_{0.08})_2O_3$ | $(NH_4)_2HPO_4$ | $V_2O_5$ | $K_2CO_3$ |
|---|---|---|---|---|
| YPV material in process | 59.47 g | 44.24 g | 15.06 g | 0.00 g |
| $KVO_3$ | 0.00 g | 0.00 g | 9.13 g | 6.91 g |

The YPV material in the process was obtained by thoroughly kneading $(Y_{0.92}Eu_{0.08})_2O_3$, $(NH_4)_2HPO_4$, and $V_2O_5$ in a ratio shown in Table 3 together with an appropriate amount of pure water through use of a motor grinder, drying the kneaded mixed material at 120° C. overnight, roughly crushing the dried mixed material through use of a mortar and a pestle, thereafter, thoroughly crushing the mixed material through use of a motor grinder, and firing the crushed mixed material at 500° C. for 2 hours in the atmosphere through use of a box-type furnace.

Further, the $KVO_3$ own product was obtained by subjecting $V_2O_5$ and $K_2CO_3$ in a ratio shown in Table 3, which are to have a molar ratio of 1:1, to wet mixing through use of a motor grinder to form a mixed material, drying the mixed material at 120° C. overnight, and thereafter, firing the mixed material at 450° C. for 2 hours in the atmosphere through use of a box-type electric furnace.

Note that the $KVO_3$ own product thus generated was considered as a single crystal phase or a $KVO_3$ compound similar thereto, and the X-ray diffraction pattern was a pattern similar to a pattern (No. 33-1052) of Powder Diffraction File (PDF) of the $KVO_3$ compound.

Next, YPV red phosphors of Examples 10 to 12 were produced through use of the generated YPV material in process and $KVO_3$ own product. The specific weighing ratios between the YPV material in process and the $KVO_3$ own product in Examples 10 to 12 are as shown in Table 4.

TABLE 4

| | x | $(Y_{0.92}Eu_{0.08})(P_{0.67}V_{0.33})O_4$ (YPV material in process) | $KVO_3$ ($KVO_3$ own product) |
|---|---|---|---|
| Example 10 | 0.002 | 97.76 g | 0.14 g |
| Example 11 | 0.02 | 97.76 g | 1.38 g |
| Example 12 | 0.1 | 97.76 g | 6.90 g |

On the other hand, prototypes of a YPV red phosphor were produced through use of the generated YPV material in the process as Comparative Examples 3 to 6.

Table 5 shows blending ratios of Comparative Examples 3 to 6. Comparative Example 3 corresponds to the case where no flux (flux) is used; Comparative Example 4 corresponds to the case where 0.001 moles of $K_2CO_3$ were added to 1 mole of the YPV material in process, followed by mixing and firing, and Comparative Example 5 corresponds to the case where 0.01 moles of $K_2CO_3$ were added to 1 mole of the YPV material in process, followed by mixing and firing. Further, Comparative Example 6 corresponds to the case where 0.002 moles of $H_3BO_3$ were added to 1 mole of the YPV material in process, followed by mixing and firing.

TABLE 5

| | YPV material in process | $K_2CO_3$ | $H_3BO_3$ |
|---|---|---|---|
| Comparative Example 3 | 97.76 g | 0.00 g | 0.00 g |
| Comparative Example 4 | 97.76 g | 0.069 g | 0.00 g |
| Comparative Example 5 | 97.76 g | 0.69 g | 0.00 g |
| Comparative Example 6 | 97.76 g | 0.00 g | 0.062 g |

Materials of Examples 10 to 12 and Comparative Examples 3 to 6 were respectively subjected to dry mixing for 10 to 20 minutes through use of a mortar and a pestle to obtain a firing material. The firing material was transferred to a firing container and fired at 1,400° C. for 2 hours in the atmosphere through use of an electric furnace to obtain each fired body.

After that, in the same way as in the case of producing the YPV red phosphors of Examples 1 to 4, each fired body was subjected to an aftertreatment (a series of treatments including rough crushing, water crushing, classification, water washing, filtration, acid washing, alkali washing, water washing, and drying) to obtain rare earth phosphovanadate phosphors of Examples 10 to 12 and Comparative Examples 3 to 6.

Figure 14:
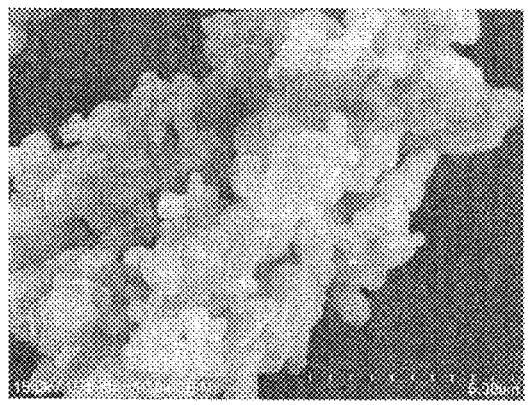
FIG. 14 is electron micrographs of rare earth phosphovanadate phosphors according to examples.
Figure 14:
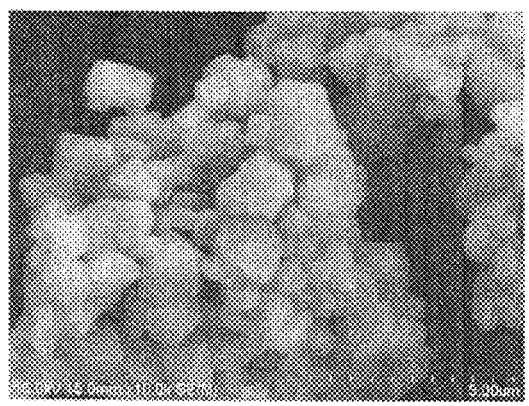
Figure 14:

FIGS. 14(a) to 14(c) are electron micrographs of the thus produced rare earth phosphovanadate phosphors magnified by 10,000 times. FIG. 14(a) shows the YPV phosphor of Example 10; FIG. 14(b) shows the YPV phosphor of Example 11; and FIG. 14(c) shows the YPV phosphor of Example 12.

Figure 15:
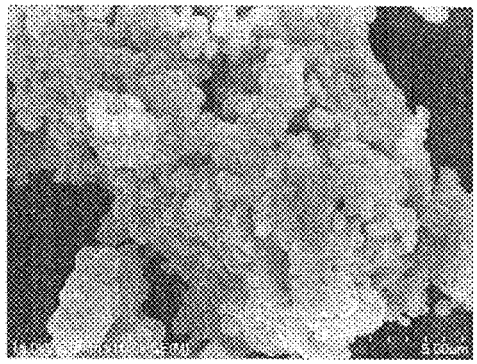
FIG. 15 is electron micrographs of rare earth phosphovanadate phosphors according to comparative examples.
Figure 15:
Figure 15:
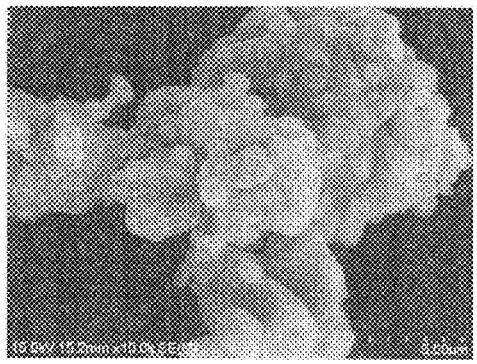
Figure 15:
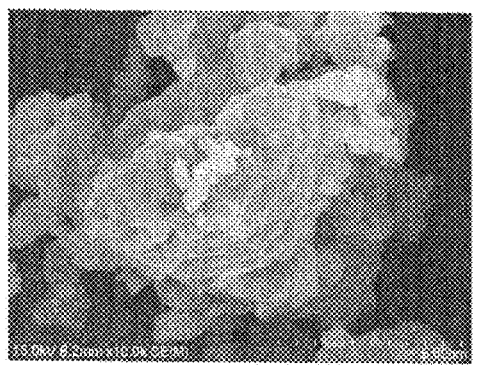

Further, FIGS. 15(a) to 15(d) are electron micrographs of the rare earth phosphovanadate phosphors of Comparative Examples 3 to 6 magnified by 10,000 times. FIG. 15(a) shows the YPV phosphor of Comparative Example 3; FIG. 15(b) shows the YPV phosphor of Comparative Example 4; FIG. 15(c) shows the YPV phosphor of Comparative Example 5; and FIG. 15(d) shows the YPV phosphor of Comparative Example 6.

As shown in FIGS. 14(a) to 14(c), the rare earth phosphovanadate phosphors of Examples 10 to 12 are a particle group in which the primary particles flocculate. However, primary particles having a unique linear uneven pattern on the surface of each particle as observed in the YPV red phosphors of Examples 1 to 4 shown in FIGS. 7(a) to 7(d) and the YPV red phosphors of Examples 6 to 9 shown in FIGS. 11(b) to 11(e) were not recognized. On the other hand, for example, in the electron micrograph of the YPV red phosphor of Example 12 shown in FIG. 14(c), a unique primary particle shape exhibiting a pseudo regular octahedron shape was recognized, appearing as a shape which was similar to a regular octahedron as a whole but in which each side present at a boundary of each surface was rounded.

The YPV red phosphors of Examples 10 to 12 were produced by the method for producing a rare earth phosphovanadate phosphor in the present disclosure, involving generating a mixture of a rare earth phosphovanadate phosphor and an alkali metal vanadate and removing the alkali metal compound. However, a unique linear uneven pattern as recognized in the primary particles of the YPV red phosphors of Examples 1 to 4 and Examples 6 to 9 was not recognized. The reason for this is considered as follows: the YPV red phosphors of Examples 10 to 12 are produced by a method for generating a rare earth phosphovanadate phosphor and an alkali metal vanadate separately and mixing them to produce a mixture of the rare earth phosphovanadate phosphor and the alkali metal vanadate. Specifically, in the generation of the YPV red phosphors of Examples 10 to 12, YPV materials are briefly reacted with each other temporarily by provisional firing at 500° C. without adding a flux, and thereafter, a potassium compound ($KVO_3$) that can function as a flux is added and the potassium compound is added in a state of a $KVO_3$ compound, which causes a reaction process of the YPV red phosphor to change, thereby differentiating a crystal growth mechanism.

In the YPV red phosphor of Comparative Example 3 using no flux, as shown in FIG. 15(a), it was recognized that primary particles tend to be fused to form large particles, and in the YPV red phosphors of Comparative Examples 4 and 5 using only $K_2CO_3$ as the flux, as shown in FIGS. 15(b) and 15(c), it was recognized that primary particles tend to have a cubic shape. Further, in the YPV red phosphor of Comparative Example 6 using only $H_3BO_3$ as the flux, as shown in FIG. 15(d), it was recognized that, although primary particles become small, they tend to be fused vigorously to form large particles, and a particle size tends to increase along with an increase in firing temperature and a mesh residue ratio in an aftertreatment step increases excessively.

Further, in the case of using a compound containing at least boron as a flux, the following tendency was recognized: a particle size increases along with an increase in firing temperature, and a mesh residue increases when a suspension obtained after water crushing in the aftertreatment is caused to pass through a 250-mesh sieve, and this tendency was similarly recognized in the case of using a combination of $K_2CO_3$ and a small amount of $H_3BO_3$ as a flux and the case of using potassium borate ($K_2B_4O_7 \cdot 4H_2O$) as a flux.

Enlargement of a particle size is not preferred, for example, from the viewpoint of the application to a PDP or the production yield of a phosphor. Therefore, in the method for producing a rare earth phosphovanadate phosphor in the present disclosure, it is preferred that a material mixture do not contain boron.

On the surfaces of primary particles in the YPV red phosphors of Comparative Examples 3 to 6 shown in FIGS. 15(a) to 15(d), no unique linear uneven pattern as observed in the YPV red phosphors of Examples 1 to 4 and Examples 6 to 9 are observed.

It also was recognized that light emitted by the YPV red phosphors of Examples 10 to 12 is red light of satisfactory red color purity having an emission peak in the vicinity of 619 nm to 620 nm, similarly to light emitted by the YPV red phosphors of Examples 1 to 4, and is similar to the light emitted by the YPV red phosphors of Comparative Examples 1 to 6.

This shows that the YPV red phosphors of Examples 10 to 12 were also produced as YPV red phosphors having a composition close to the YPV red phosphor represented by a general formula: $(Y_{0.92}Eu_{0.08})(P_{0.67}V_{0.33})O_4$ which was a production target.

Figure 16:
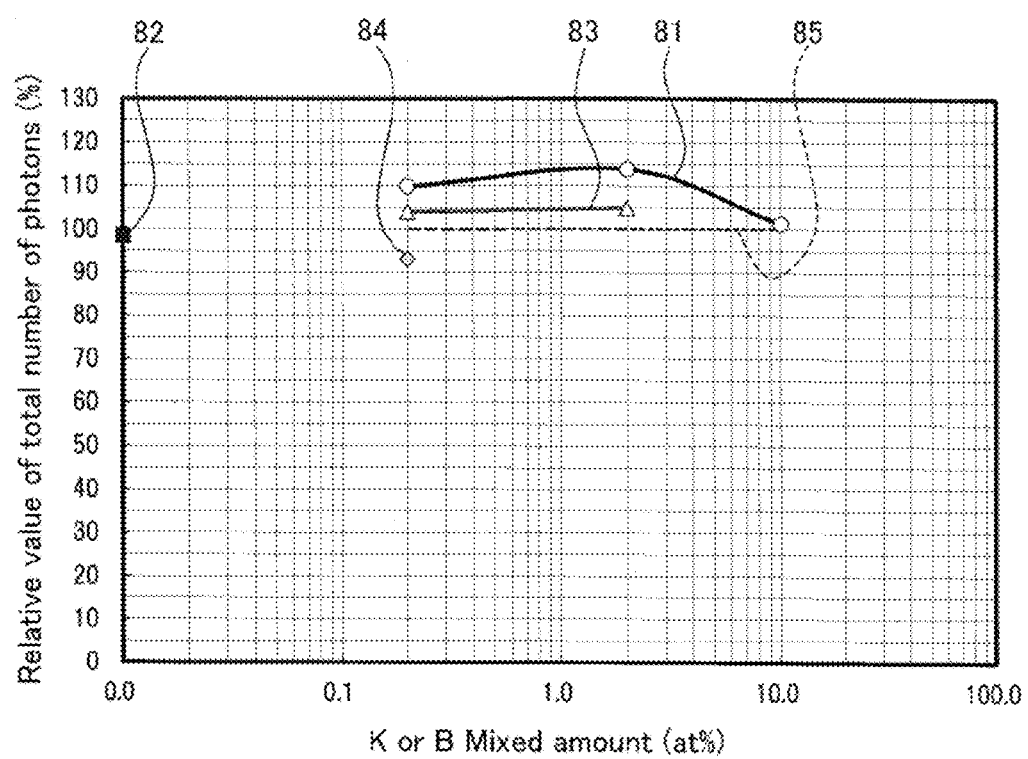
FIG. 16 is a graph showing a relationship between the flux added amount and the emission characteristics in the rare earth phosphovanadate phosphors according to the examples and the comparative examples.

FIG. 16 shows a relationship between the total number of photons of red light obtained under a 146 nm excitation condition and the mixed amount "x" (atomic %) of K or B with respect to 1 mole of the YPV red phosphor as a relative numerical value with respect to the value of the commercially available YPV phosphor for a PDP of Comparative Example 1 defined to be 100%, regarding the YPV red phosphors of Examples 10 to 12 and the YPV red phosphors of Comparative Examples 3 to 6. Note that, also in FIG. 16, the relative values of the total number of photons were obtained by calculation from emission spectrum data for each 1 nm in a wavelength range of 350 nm to 730 nm.

In FIG. 16, a solid line 81 corresponds to the total number of photons of the YPV phosphors of Examples 10 to 12; a symbol ■ 82 corresponds to the total number of photons of the YPV phosphor of Comparative Example 3; a solid line 83 corresponds to the total number of photons of the YPV phosphors of Comparative Examples 4 and 5; a symbol ◇ 84 corresponds to the total number of photons of the YPV phosphor of Comparative Example 6; and a dotted line 85 corresponds to the total number of photons of the YPV phosphor of Comparative Example 1.

As shown in FIG. 16, it was confirmed that the total number of photons of the YPV red phosphors of Examples 10 to 12 (solid line 81) exhibits emission characteristics at a higher level as a whole, compared with the total number of photons of the YPV red phosphor of Comparative Example 3 using no alkali metal compound and boron compound (■ 82), the total number of photons of the YPV red phosphors of Comparative Examples 4 and 5 using only an alkali metal compound as a flux (solid line 83), or the total number of photons of the YPV red phosphor of Comparative Example 6 using only a boron compound as a flux. Note that, although the disclosure of data is omitted, a relationship between the emission peak height of the YPV red phosphors of Examples 10 to 12 and the mixed amount "x" of K or B also has a tendency similar to that of the relationship between the total number of photons and the mixed amount "x" of K or B shown in FIG. 16.

This shows that, according to the method for producing a rare earth phosphovanadate phosphor in the present disclosure, a YPV red phosphor having emission characteristics higher than those of the YPV red phosphors of Comparative Example 1 and Comparative Examples 3 to 6 can be produced.

The YPV red phosphors of Examples 1 to 12 are all described only based on a rare earth phosphovanadate red phosphor having a phosphor composition: $(Y_{0.92}Eu_{0.08})(P_{0.67}V_{0.33})O_4$ which is a production target. However, the method for producing a rare earth phosphovanadate phosphor in the present disclosure described above also can be widely applied to rare earth phosphovanadate red phosphors having varying Eu-activation amounts (Eu/(Y+Eu)) and phosphorus ratios (P/(P+V)) and the other rare earth phosphovanadate phosphors in terms of the generation mechanism of a phosphor.

Examples 13 to 34

Hereinafter, YPV red phosphors of Examples 13 to 34 were produced by a solid phase reaction through use of potassium metavanadate as an alkali metal compound material, with a red phosphor represented by the composition: $(Y_{0.92}Eu_{0.08})(P_{0.67}V_{0.33})O_4$ being a production target, in the same way as in Examples 1 to 4. Note that, for producing the YPV red phosphors of Examples 13 to 34, how particles of YPV red phosphors to be produced change was checked in detail, based on a value of a molar ratio "x" of the $KVO_3$ added amount with respect to $(Y_{0.92}Eu_{0.08})(P_{0.67}V_{0.33})O_4$ that was a production target in the stage of a fired body before an aftertreatment and firing temperature for producing a mixture of a rare earth phosphovanadate phosphor and an alkali metal vanadate.

As the materials for the YPV red phosphors of Examples 13 to 34, the following materials were used.

$(Y_{0.92}Eu_{0.08})_2O_3$ coprecipitate having a purity of 3 N or more, manufactured by Shinetsu Chemical Co., Ltd.

Diammonium phosphate $((NH_4)_2HPO_4)$ having a purity of 2 N or more, manufactured by Wako Pure Chemical Industries, Ltd.

Vanadium pentoxide $(V_2O_5)$ having a purity of 4 N, manufactured by Kojundo Chemical Laboratory Co., Ltd.

Potassium metavanadate $(KVO_3)$ own product

Note that the $KVO_3$ own product was obtained by subjecting $V_2O_5$ and $K_2CO_3$ to wet mixing so that a molar ratio became 1:1 through use of a motor grinder to obtain a mixed material, drying the mixed material at 120° C. overnight, and thereafter, firing the resultant mixed material at 450° C. for 2 hours in the atmosphere through use of a box-type electric furnace, in the same way as in the own products used for production in Examples 10 to 12.

In the same way as in the production of the YPV red phosphors of Examples 1 to 4, the above-mentioned compound materials were weighed so as to produce a mixture of $(Y_{0.92}Eu_{0.08})(P_{0.67}V_{0.33})O_4$ and $KVO_3$ in a molar ratio of 1:x by a reaction. Table 6 shows specific weighing ratios of Examples 13 to 34.

Table 6 also shows weighing ratios of compound materials in the YPV red phosphors using no potassium compound, that is, the YPV red phosphors in which x=0, produced as Comparative Examples 7 and 8.

These materials were kneaded thoroughly together with an appropriate amount of pure water through use of a motor grinder, and the kneaded mixed material was dried at 120° C. overnight. After that, the dried mixed material was roughly crushed through use of a mortar and a pestle, and crushed thoroughly through use of a mortar grinder. The resultant mixed material was fired for 2 hours in the atmosphere through use of a box-type electric furnace to obtain a fired body. The firing temperature was set to 1,300° C. in Examples 13 to 23 and Comparative Example 7, and the firing temperature was set to 1,400° C. in Examples 24 to 34 and Comparative Example 8.

After that, in the same way as in the case of producing the YPV red phosphors of Examples 1 to 4, each of the fired bodies obtained by firing under the above-mentioned firing condition was subjected to an aftertreatment (a series of treatments including rough crushing, water crushing, classification, water washing, filtration, acid washing, alkali washing, water washing, and drying) to obtain rare earth phosphovanadate phosphors of Examples 13 to 34 and Comparative Examples 7 and 8.

Figure 17:
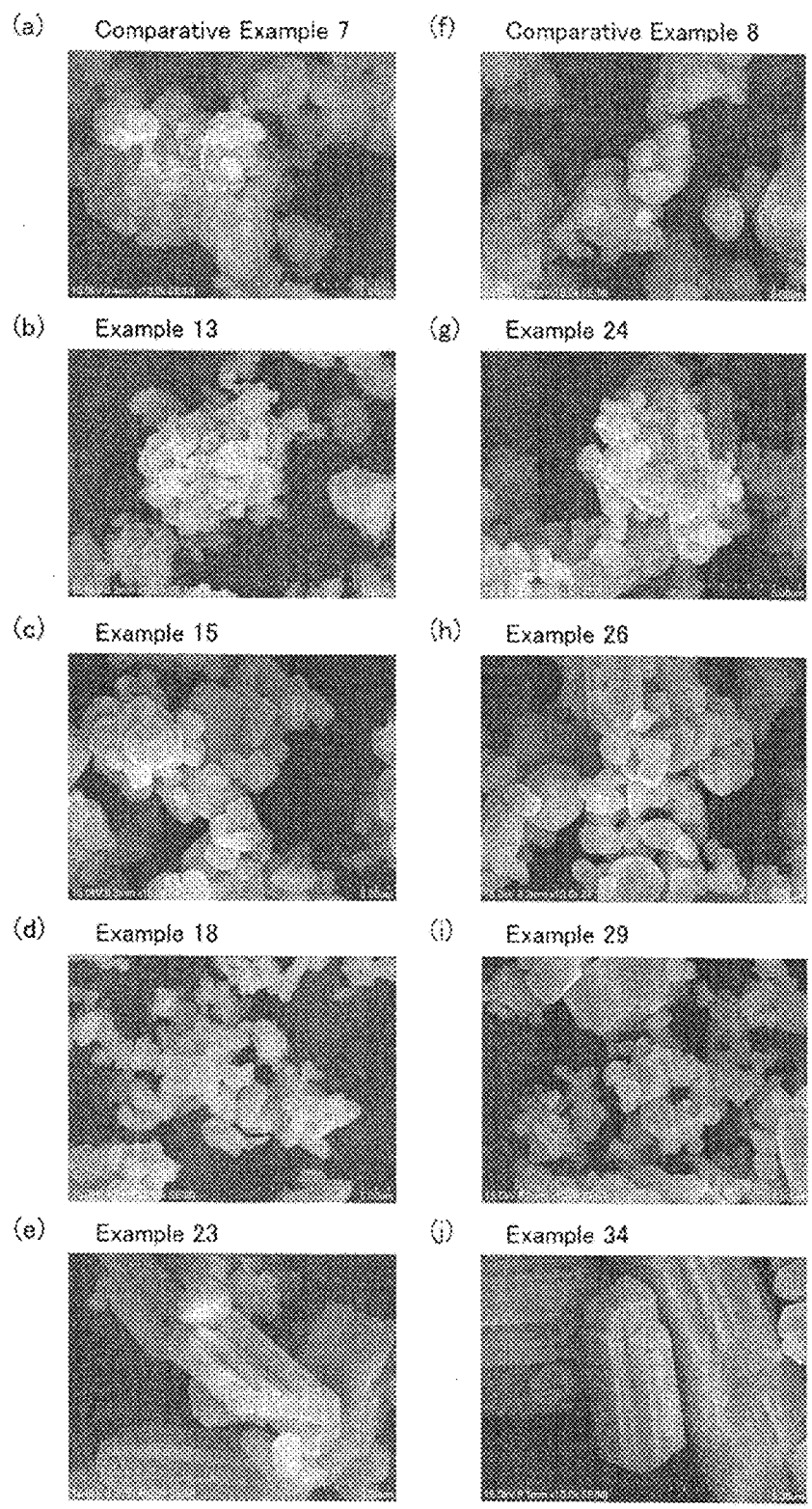
FIG. 17 is electron micrographs of rare earth phosphovanadate phosphors according to examples and comparative examples.
Figure 18:
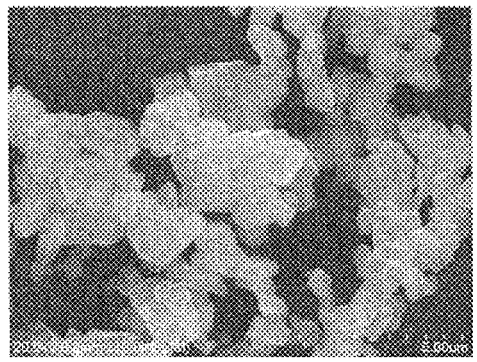
FIG. 18 is electron micrographs of rare earth phosphovanadate phosphors according to examples.
Figure 18:
Figure 18:
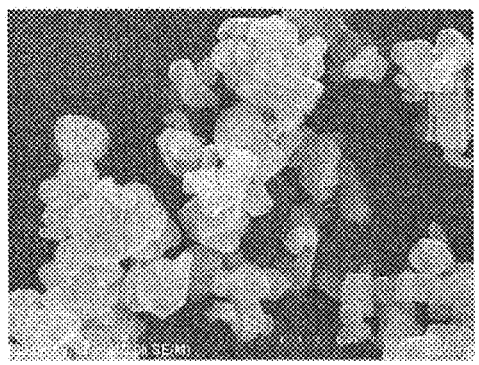
Figure 18:
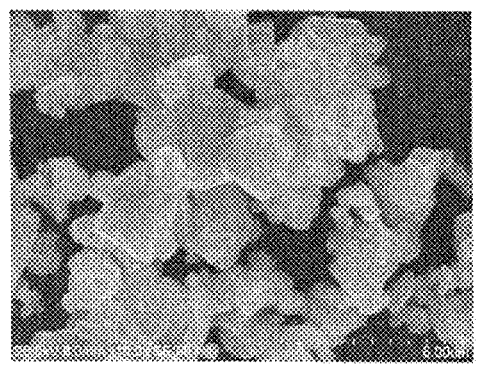
Figure 18:
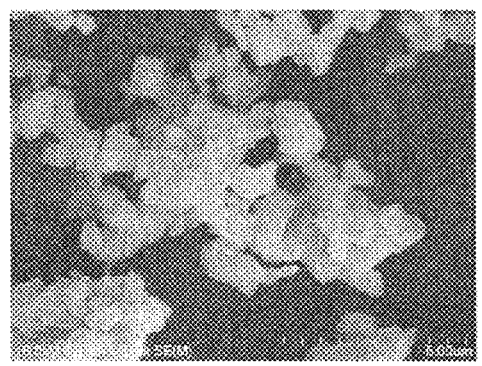
Figure 18:
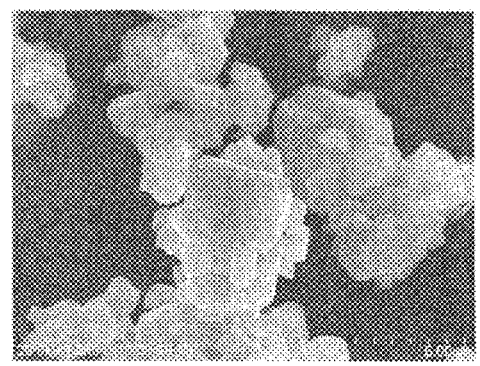

FIGS. 17 and 18 show parts of electron micrographs magnified by 10,000 times of the rare earth phosphovanadate phosphors of Examples 13 to 34 and the rare earth phosphovanadate phosphors of Comparative Examples 7 and 8 thus produced.

FIG. 17 shows a change in particle shape of the YPV red phosphors to be produced, depending on the value of a molar ratio "x" of the $KVO_3$ added amount with respect to $(Y_{0.92}Eu_{0.08})(P_{0.67}V_{0.33})O_4$ and the firing temperature for producing a mixture of a rare earth phosphovanadate phosphor and an alkali metal vanadate. In FIG. 17, the value of "x" is set to increase from an upper part to a lower part, that is, from (a) to (e) and from (f) to (j), and in order to grasp the entire tendency, micrographs are selected and shown, where "x" is equal to 0, 0.0003, 0.003, 0.03, and 0.3, the relationship of which is such that an equal interval is formed in a logarithmic display. Further, in FIG. 17, the cases where the firing temperature is 1,300° C. are shown as (a) to (e) on the left side, and the cases where the firing temperature is 1,400° C. are shown as (f) to (j) on the right side. That is, FIG. 17(a) is the electron micrograph of the YPV red phosphor of Comparative Example 7; FIG. 17(b) is the electron micrograph of the YPV red phosphor of Example 13; FIG. 17(c) is the electron micrograph of the YPV red phosphor of Example 15; FIG. 17(d) is the electron micrograph of the YPV red phosphor of Example 18; and FIG. 17(e) is the electron micrograph of the YPV red phosphor of Example 23. Further, FIG. 17(f) is the electron micrograph of the YPV red phosphor of Comparative Example 8; FIG. 17(g) is the electron micrograph of the YPV red phosphor of

TABLE 6

|  | x | $(Y_{0.92}Eu_{0.08})_2O_3$ | $(NH_4)_2HPO_4$ | $V_2O_5$ | $KVO_3$ |
| --- | --- | --- | --- | --- | --- |
| Examples 13 and 24 | 0.0003 | 19.824 g | 14.746 g | 5.020 g | 0.007 g |
| Examples 14 and 25 | 0.001 | 19.824 g | 14.746 g | 5.020 g | 0.023 g |
| Examples 15 and 26 | 0.003 | 19.824 g | 14.746 g | 5.020 g | 0.069 g |
| Examples 16 and 27 | 0.01 | 19.824 g | 14.746 g | 5.020 g | 0.230 g |
| Examples 17 and 28 | 0.02 | 19.824 g | 14.746 g | 5.020 g | 0.460 g |
| Examples 18 and 29 | 0.03 | 19.824 g | 14.746 g | 5.020 g | 0.690 g |
| Examples 19 and 30 | 0.04 | 19.824 g | 14.746 g | 5.020 g | 0.920 g |
| Examples 20 and 31 | 0.05 | 19.824 g | 14.746 g | 5.020 g | 1.150 g |
| Examples 21 and 32 | 0.06 | 19.824 g | 14.746 g | 5.020 g | 1.380 g |
| Examples 22 and 33 | 0.1 | 19.824 g | 14.746 g | 5.020 g | 2.301 g |
| Examples 23 and 34 | 0.3 | 19.824 g | 14.746 g | 5.020 g | 6.902 g |
| Comparative Examples 7 and 8 | 0 | 19.824 g | 14.746 g | 5.020 g | 0.000 g |

Example 24; FIG. 17(h) is the electron micrograph of the YPV red phosphor of Example 26; FIG. 17(i) is the electron micrograph of the YPV red phosphor of Example 29; and FIG. 17(j) is the electron micrograph of the YPV red phosphor of Example 34.

Similarly to FIG. 17, FIG. 18 also shows a change in particle shape of the YPV red phosphors to be produced, depending on a change in value of a molar ratio "x" of the $KVO_3$ added amount with respect to $(Y_{0.92}Eu_{0.08})(P_{0.67}V_{0.33})O_4$. In FIG. 18, as described with reference to FIG. 19, as YPV phosphors which exhibit emission characteristics equal to or higher than those of the commercially available conventional YPV phosphor and which are in such a range that relatively small primary particles are obtained, phosphors are selected and shown that satisfy x=0.01, 0.02, 0.03, 0.04, 0.05, and 0.06 and are subjected to firing at a firing temperature of 1,300° C. That is, FIG. 18(a) is the electron micrograph of the YPV red phosphor of Example 16; FIG. 18(b) is the electron micrograph of the YPV red phosphor of Example 17; FIG. 18(c) is the electron micrograph of the YPV red phosphor of Example 18; FIG. 18(d) is the electron micrograph of the YPV red phosphor of Example 19; FIG. 18(e) is the electron micrograph of the YPV red phosphor of Example 20; and FIG. 18(f) is the electron micrograph of the YPV red phosphor of Example 21.

The rare earth phosphovanadate phosphors produced by the production method in the present disclosure, shown in FIGS. 17(b) to 17(e), FIGS. 17(g) to 17(j), and FIGS. 18(a) to 18(f) are all recognized to be a particle croup in which primary particles flocculate. It was recognized particularly from each electron micrograph shown in FIG. 17 that as a numerical value of a molar ratio "x" of $KVO_3$ with respect to $(Y_{0.92}Eu_{0.08})(P_{0.67}V_{0.33})O_4$ increases, a primary particle size tends to decrease gradually in a range of $0 \leq x \leq 0.03$, and after the primary particle size exhibits the tendency of becoming minimum in the vicinity of x=0.03, the primary particle size increases gradually in a range of $0.03 \leq x \leq 0.3$.

Note that primary particles having a unique linear uneven pattern on the surface of each particle as observed in the YPV red phosphors of Examples 1 to 4 and Examples 6 to 9 were recognized in a range of 0.06<x.

It also was recognized that there is a tendency that a primary particle size is relatively increased by raising the firing temperature for producing a mixture of a rare earth phosphovanadate phosphor and an alkali metal vanadate from 1,300° C. to 1,400° C.

According to the method for producing a rare earth phosphovanadate phosphor in the present disclosure, a primary particle size can be controlled in a range of several 100 nm to several 10 µm based on the added amount of potassium metavanadate ($KVO_3$)) and the firing temperature.

It was confirmed that light emitted by the YPV red phosphors of Examples 13 to 34 is red light of satisfactory red color purity having an emission peak in the vicinity of 619 nm to 620 nm in the same way as in the light emitted by the YPV red phosphors of Examples 1 to 4, and is similar to light emitted by the YPV red phosphors of Comparative Examples 1 to 6.

This shows that the YPV red phosphors of Examples 13 to 36 were also produced as those which have a composition close to that of the YPV red phosphor represented by a general formula: $(Y_{0.92}Eu_{0.08})(P_{0.67}V_{0.33})O_4$, which was a production target.

Figure 19:
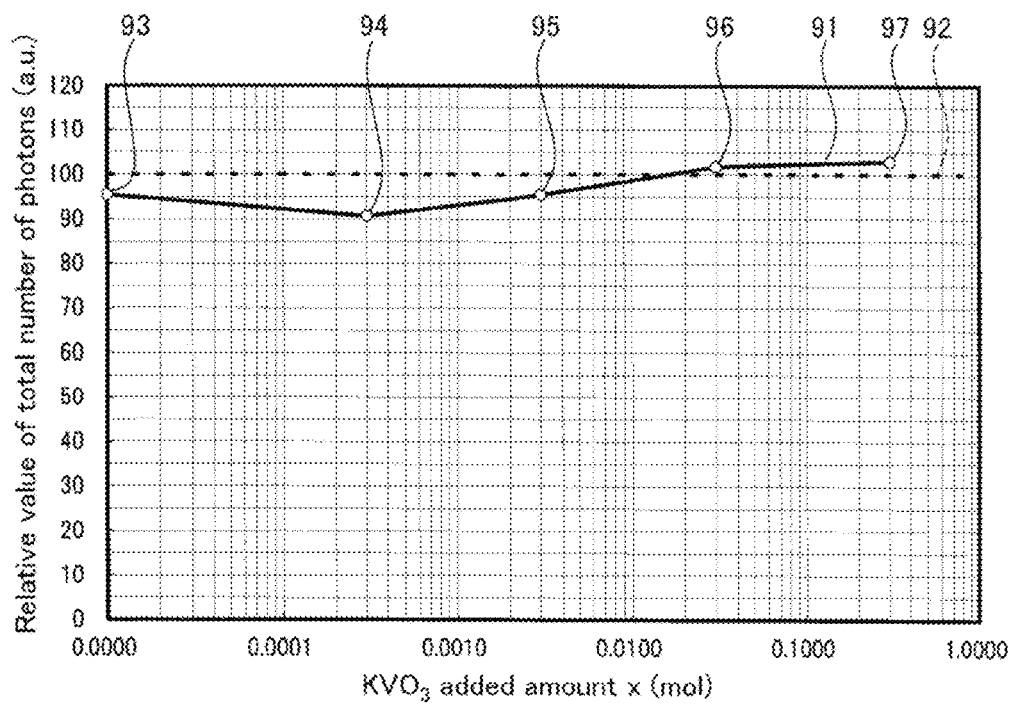
FIG. 19 is a graph showing a relationship between the $KVO_3$ added amount and the emission characteristics in the rare earth phosphovanadate phosphors according to the examples and the comparative examples.

FIG. 19 shows a relationship between the total number of photons of red light obtained under a 146 nm excitation condition and the added amount "x" (mol) of potassium metavanadate ($KVO_3$) with respect to 1 mole of the YPV red phosphor as a relative numerical value with respect to the value of the commercially available YPV phosphor for a PDP of Comparative Example 1 defined to be 100%, regarding the YPV red phosphors of Comparative Example 7 and Examples 13, 15, 18, and 23. In FIG. 19, a solid line 91 shows a transition of the total number of photons of the YPV phosphors of Comparative Example 7 (reference numeral 93), Example 13 (reference numeral 94), Example 15 (reference numeral 95), Example 18 (reference numeral 96), and Example 23 (reference numeral 97), and a dotted line 92 shows the total number of photons of the YPV phosphor of Comparative Example 1.

Figure 20:
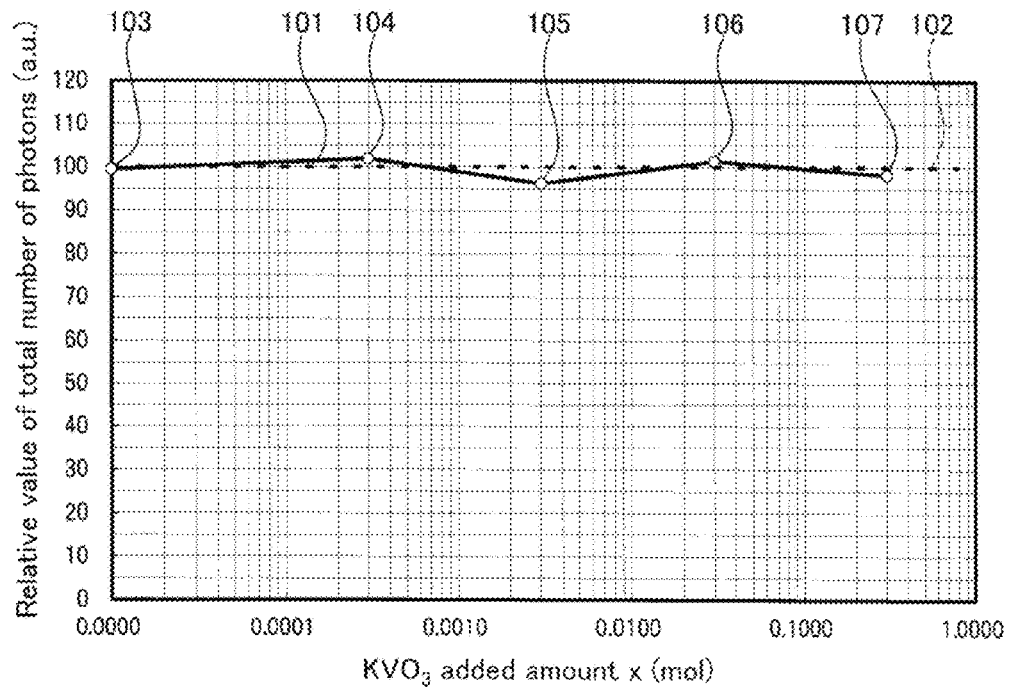
FIG. 20 is a graph showing a relationship between the $KVO_3$ added amount and the emission characteristics in the rare earth phosphovanadate phosphors according to the examples and the comparative examples.

Further, in the same way as in FIG. 19, FIG. 20 shows a relationship between the total number of photons of red light obtained under a 146 nm excitation condition and the added amount "x" (mol) of $KVO_3$ with respect to 1 mole of the YPV red phosphor as a relative numerical value with respect to the value of Comparative Example 1 defined to be 100%, regarding the YPV red phosphors of Comparative Example 8 and Examples 24, 26, 29, and 34. In FIG. 20, a solid line 101 shows a transition of the total number of photons of the YPV phosphors of Comparative Example 8 (reference numeral 103), Example 24 (reference numeral 104), Example 26 (reference numeral 105), Example 29 (reference numeral 106), and Example 34 (reference numeral 107), and a dotted line 102 shows the total number of photons of the YPV phosphor of Comparative Example 1.

Note that, also in FIGS. 19 and 20, the relative values of the total number of photons were obtained by calculation from emission spectrum data for each 1 nm in a wavelength range of 350 nm to 730 nm.

As shown in FIG. 19, it was recognized that there is a tendency that the total number of photons of the YPV red phosphors of Comparative Example 7 and Examples 13, 15, 18, and 23 that are the YPV phosphors subjected to firing at a firing temperature of 1,300° C. increases along with an increase in the added amount "x" of $KVO_3$ and is saturated in a range of $0.03 \leq x \leq 0.3$.

Note that the maximum value thereof exceeds the total number of photons of the YPV phosphor of Comparative Example 1 by several %.

Further, as shown in FIG. 20, the total number of photons of the YPV red phosphors of Comparative Example 8 and Examples 24, 26, 29, and 34 that are the YPV phosphors subjected to firing at a firing temperature of 1,400° C. exhibited almost a constant value irrespective of the added amount "x" of $KVO_3$.

Note that the maximum value thereof was almost equivalent to the total number of photons of the YPV phosphor of Comparative Example 1.

This shows that, according to the method for producing a rare earth phosphovanadate phosphor in the present disclosure, a rare earth phosphovanadate phosphor capable of exhibiting emission characteristics equal to or higher than those of the commercially available conventional YPV phosphor of Comparative Example 1 can be produced.

Further, the results shown in FIGS. 17 and 18 and FIGS. 19 and 20 show that, according to the method for producing a rare earth phosphovanadate phosphor in the present disclosure, a high-efficiency rare earth phosphovanadate phosphor can be produced, the particle size of which can be controlled in a range of several 100 nm to several 10 µm.

Examples 35 to 38

Hereinafter, YPV red phosphors of Examples 35 to 38 were produced with the $(Y_{0.92}Eu_{0.08})(P_{0.67}V_{0.33})O_4$ red phosphor having the same composition as that of Examples 1 to 4 being a production target. For producing the YPV red phosphors of Examples 35 to 38, the effect of addition of silicon oxide ($SiO_2$) during the production was checked.

As the materials for the YPV red phosphors of Examples 35 to 38, the following materials were used.

$(Y_{0.92}Eu_{0.08})_2O_3$ coprecipitate having a purity of 3 N or more, manufactured by Shinetsu Chemical Co., Ltd.

Diammonium phosphate $((NH_4)_2HPO_4)$ having a purity of 2 N or more, manufactured by Wako Pure Chemical Industries, Ltd.

Vanadium pentoxide ($V_2O_5$) having a purity of 4 N, manufactured by Kojundo Chemical Laboratory Co., Ltd.

Potassium metavanadate ($KVO_3$) own product

Silicon dioxide ($SiO_2$) having a purity larger than 3 N, manufactured by Nippon Aero Gel Co., Ltd.

Note that, as the $KVO_3$ own product, the same product as that used for the YPV phosphors of Examples 10 to 34 was used.

The above-mentioned compound materials were weighed so that a mixture of $(Y_{0.92}Eu_{0.08})(P_{0.67}V_{0.33})O_4$, $KVO_3$, and $SiO_2$ was produced in a molar ratio of 1:0.03:y by a reaction in the same way as in the case where the YPV red phosphor of Example 18 was produced in which a molar ratio of $(Y_{0.92}Eu_{0.08})(P_{0.67}V_{0.33})O_4$ and $KVO_3$ was 1:0.03. Table 7 shows specific weighing ratios of Examples 35 to 38.

TABLE 7

| | y | $(Y_{0.92}Eu_{0.08})_2O_3$ | $(NH_4)_2HPO_4$ | $V_2O_5$ | $KVO_3$ | $SiO_2$ |
|---|---|---|---|---|---|---|
| Example 35 | 0.003 | 19.824 g | 14.746 g | 5.020 g | 0.690 g | 0.030 g |
| Example 36 | 0.01 | 19.824 g | 14.746 g | 5.020 g | 0.690 g | 0.101 g |
| Example 37 | 0.03 | 19.824 g | 14.746 g | 5.020 g | 0.690 g | 0.303 g |
| Example 38 | 0.1 | 19.824 b | 14.746 g | 5.020 g | 0.690 g | 1.010 g |

The above-mentioned materials were thoroughly kneaded together with an appropriate amount of pure water through use of a mortar grinder, and the kneaded mixed material was dried at 120° C. overnight. After that, the dried mixed material was roughly crushed through use of a mortar and a pestle, and thoroughly crushed through use of the mortar grinder. Then, the resultant material was fired at 1,300° C. for 2 hours in the atmosphere through use of a box-type electric furnace to obtain a fired body.

After that, in the same way as in the case of producing the YPV red phosphors of Examples 1 to 4, the fired body obtained by firing under the above-mentioned temperature condition was subjected to an aftertreatment (a series of treatments including rough crushing, water crushing, classification, water washing, filtration, acid washing, alkali washing, water washing, and drying) to obtain rare earth phosphovanadate phosphors of Examples 35 to 38.

In the results of the electron microscope observation of Examples 35 to 38, no substantial difference was recognized, compared with the observation results of the YPV red phosphor of Example 18 shown in FIGS. 17(d) and 18(c), and hence, the illustration thereof in figures and the detailed description thereof are omitted. However, a particle group made of primary particles having a particle size of about 1 μm was observed.

Note that, it was recognized that light emitted by the YPV red phosphors of Examples 35 to 38 is also red light of satisfactory red color purity having an emission peak in the vicinity of 619 to 620 nm in the same way as in the light emitted by the YPV red phosphors of Examples 1 to 4, and is similar to light emitted by the YPV red phosphors of Comparative Examples 1 to 6.

This shows that the YPV red phosphors of Examples 35 to 38 were also produced as those having a composition close to that of the YPV red phosphor represented by a general formula: $(Y_{0.92}Eu_{0.08})(P_{0.67}V_{0.33})O_4$.

Figure 21:
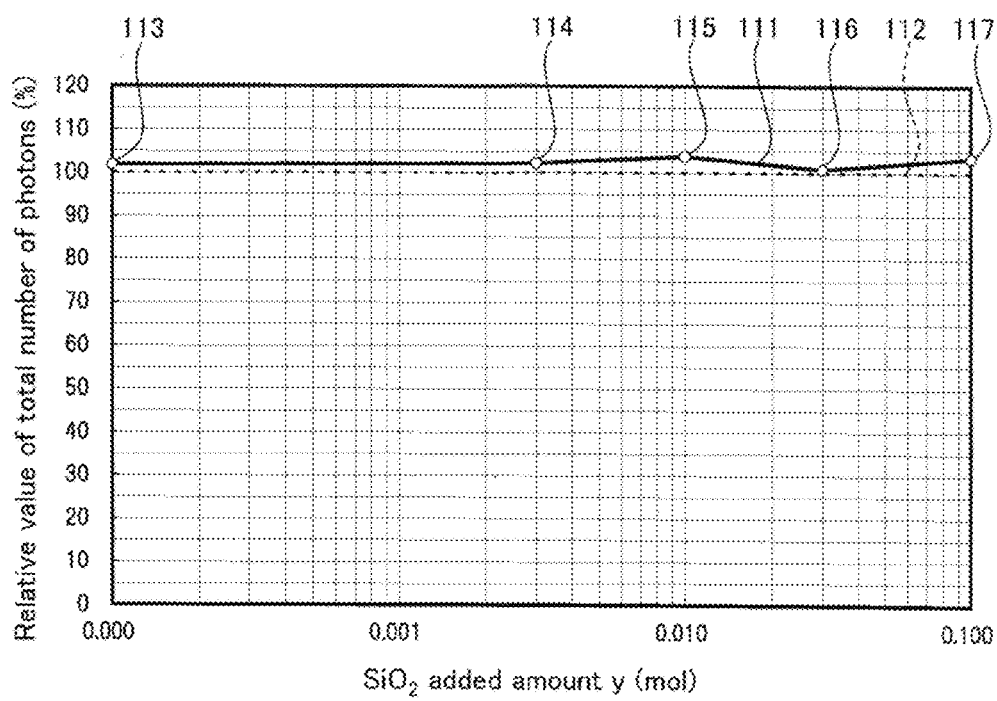
FIG. 21 is a graph showing a relationship between the $SiO_2$ added amount and the emission characteristics in rare earth phosphovanadate phosphors according to examples.

FIG. 21 shows a relationship between the total number of photons of red light obtained under a 146 nm excitation condition and the added amount "y" (mol) of $SiO_2$ as a relative numerical value with respect to the value of Comparative Example 1 defined to be 100%, regarding the YPV red phosphors of Examples 18 and 35 to 38. In FIG. 21, a solid line 111 shows a transition of the total number of photons of the YPV phosphors of Example 18 (reference numeral 113), Example 35 (reference numeral 114), Example 36 (reference numeral 115), Example 37 (reference numeral 116), and Example 38 (reference numeral 117), and a dotted line 112 shows the total number of photons of the YPV phosphor of Comparative Example 1.

Note that, also in FIG. 21, the relative values of the total number of photons were obtained by calculation from emission spectrum data for each 1 nm in a wavelength range of 350 nm to 730 nm.

As shown in FIG. 21, the following tendency was recognized: the total number of photons of the YPV red phosphors of Example 18 and Examples 35 to 38 slightly increases along with an increase in the added amount "y" of $SiO_2$ and exhibits a maximum value in the vicinity of y=0.01, and thereafter, slightly decreases when the added amount "y" is further increased. Note that the maximum value thereof exceeded the total number of photons in Example 18 by 2 to 3%.

This shows that, according to the method for producing a rare earth phosphovanadate phosphor in the present disclosure, a rare earth phosphovanadate phosphor exhibiting emission characteristics equal to or higher than those of the commercially available conventional YPV phosphor of Comparative Example 1 can be produced by adding $SiO_2$.

Further, although no data is shown, in the case where a vertical axis is set to represent a main peak height or luminance in the vicinity of 619 nm of an emission spectrum of the YPV red phosphor and a horizontal axis is set to represent the added amount "y" of $SiO_2$, the tendency almost similar to that of FIG. 21 is also obtained.

Figure 22:
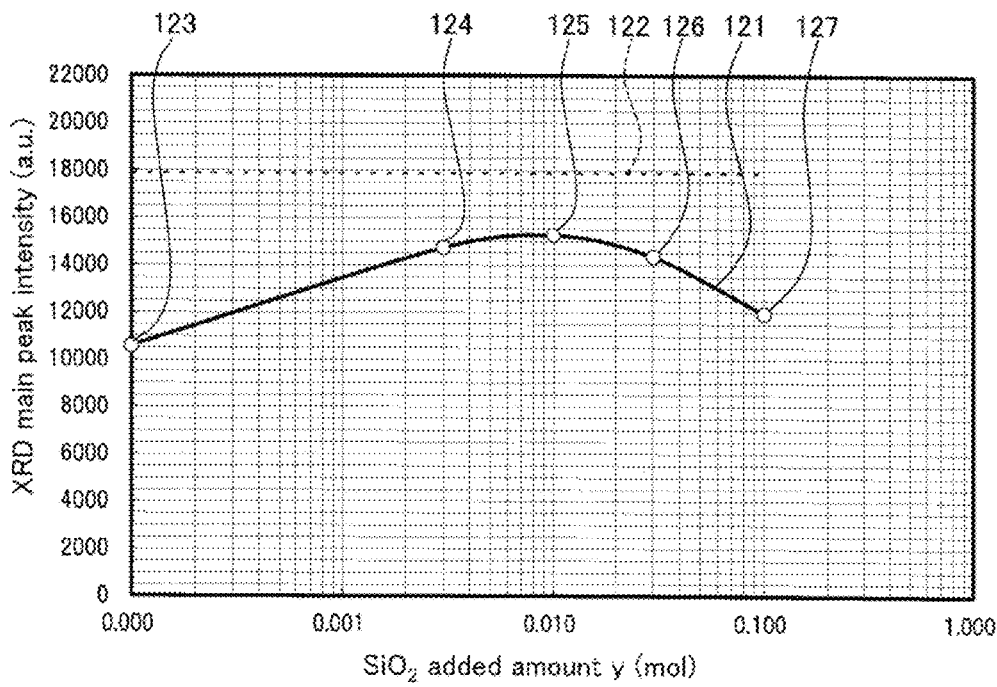
FIG. 22 is a graph showing a relationship between the $SiO_2$ added amount and the X-ray diffraction intensity in rare earth phosphovanadate phosphors according to examples.

FIG. 22 is a graph showing a relationship between the main peak intensity recognized in the vicinity of 25.5° of a diffraction angle (2θ) in an X-ray diffraction pattern and the added amount "y" (mol) of $SiO_2$, regarding the YPV red phosphors of Example 18 and Examples 35 to 38.

Figure 23:
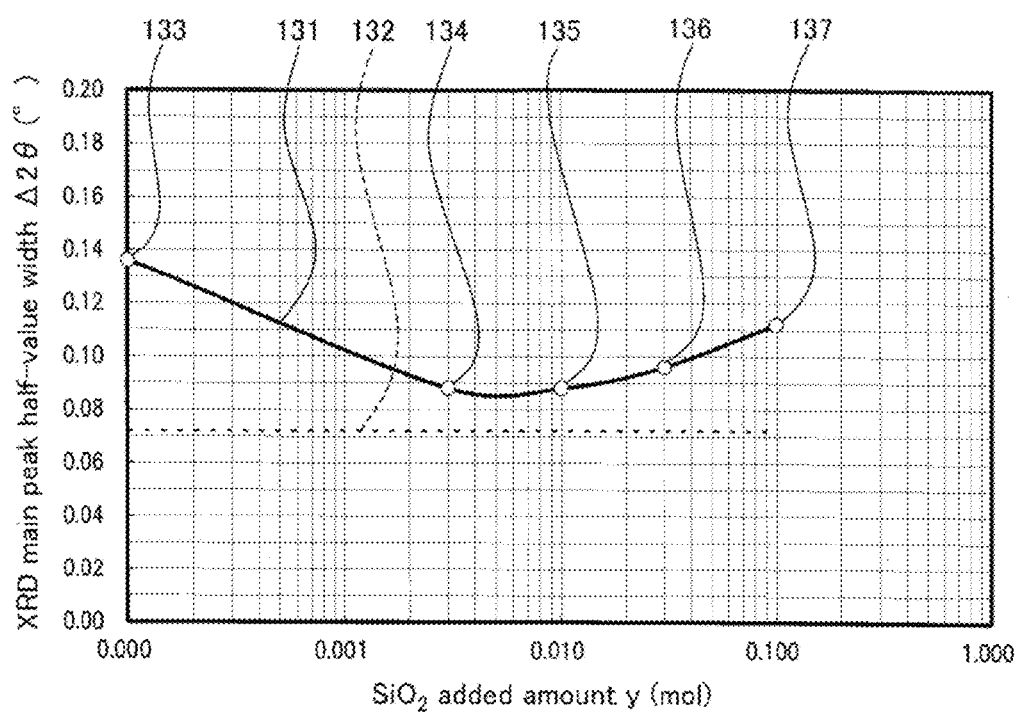
FIG. 23 is a graph showing a relationship between the $SiO_2$ added amount and the X-ray diffraction peak half-value width in the rare earth phosphovanadate phosphors according to the examples.

Further, FIG. 23 is a graph showing a relationship between the main peak half-value width (Δ2θ(°)) recognized in the vicinity of a diffraction angle (2θ) recognized in the X-ray diffraction pattern and the added amount "y" (mol) of $SiO_2$, regarding the YPV red phosphors of Example 18 and Examples 35 to 38.

In FIG. 22, a solid line 121 shows a transition of the main peak intensity of Example 18 (reference numeral 123), Example 35 (reference numeral 124), Example 36 (reference numeral 125), Example 37 (reference numeral 126), and Example 38 (reference numeral 127), and a dotted line 122 shows a value of the main peak intensity of the YPV phosphor of Comparative Example 1. Further, in FIG. 23, a solid line 131 shows a transition of the main peak half-value width of Example 18 (reference numeral 133), Example 35 (reference numeral 134), Example 36 (reference numeral 135), Example 37 (reference numeral 136), and Example 38 (reference numeral 137), and a dotted line 132 shows a value of the main peak half-value width of the YPV phosphor of Comparative Example 1.

As is understood from FIG. 22, the following tendency was recognized: the main peak intensity increases along with an increase in the added amount "y" of $SiO_2$ and exhibits a maximum value in the vicinity of y=0.01, and thereafter, decreases.

Further, as is understood from FIG. 23, the following tendency was recognized: the main peak half-value width decreases along with an increase in the added amount "y" of $SiO_2$ and exhibits a minimum value in the vicinity of y=0.01, and thereafter, increases.

The results of FIGS. 22 and 23 show that the addition of about 1 mol % (y=0.01) of $SiO_2$ improves the crystallinity of a rare earth phosphovanadate phosphor.

That is, it can be considered that the enhancement of emission characteristics caused by the addition of $SiO_2$ described with reference to FIG. 21 is achieved by the improvement of the crystallinity of a rare earth phosphovanadate phosphor involved in the addition of $SiO_2$.

Accordingly, it was found by the study of the YPV phosphors produced in Examples 35 to 38 that both the improvement of the crystallinity of a rare earth phosphovanadate phosphor and the enhancement of emission characteristics can be achieved by adding a small amount of $SiO_2$.

Examples 39 and 40

Hereinafter, YPV red phosphors of Examples 39 and 40 were produced by a solid phase reaction through use of potassium metavanadate as an alkali metal compound material, with a $(Y_{0.95}Eu_{0.05})(P_{0.62}V_{0.38})O_4$ red phosphor that was slightly different from the YPV phosphors produced in Examples 1 to 4 in terms of a composition being a production target. Note that, for producing the YPV red phosphors of Examples 39 and 40, the effect of adding $SiO_2$ was checked in detail.

For producing the YPV red phosphors of Examples 39 and 40, the following materials were used.

$(Y_{0.95}Eu_{0.05})_2O_3$ coprecipitate having a purity of 3 N or more, manufactured by Shinetsu Chemical Co., Ltd.

Diammonium phosphate (($NH_4)_2HPO_4$) having a purity of 2 N or more, manufactured by Wako Pure Chemical Industries, Ltd.

Vanadium pentoxide ($V_2O_5$) having a purity of 4 N, manufactured by Kojundo Chemical Laboratory Co., Ltd.

Potassium metavanadate ($KVO_3$) own product

Note that the $KVO_3$ own product was obtained by subjecting $V_2O_5$ and $K_2CO_3$ to wet mixing through use of a mortar grinder so that a molar ratio became 1:1, drying the mixed material at 120° C. overnight, and firing the dried mixed material at 450° C. for 2 hours in the atmosphere through use of a box-type electric furnace, in the same way as in the own product used for producing the YPV phosphors of Examples 10 to 38.

$(Y_{0.95}Eu_{0.05})(P_{0.62}V_{0.38})O_4$, $KVO_3$, and $SiO_2$ were weighed so that a mixture of those compound materials was produced in a molar ratio of 1:0.03:y (where y is 0 or 0.01) by a reaction, in the same way as in the case of producing the YPV red phosphors of Examples 18 and 36 in which a molar ratio between $(Y_{0.92}Eu_{0.08})(P_{0.67}V_{0.33})O_4$ and $KVO_3$ is 1:0.03. Table 8 shows specific weighing ratios of Examples 39 and 40.

TABLE 8

|  | y | $(Y_{0.95}Eu_{0.05})_2O_3$ | $(NH_4)_2HPO_4$ | $V_2O_5$ | $KVO_3$ | $SiO_2$ |
|---|---|---|---|---|---|---|
| Example 39 | 0 | 19.519 g | 13.646 g | 5.781 g | 0.690 g | 0.000 g |
| Example 40 | 0.01 | 19.519 g | 13.646 g | 5.781 g | 0.690 g | 0.101 g |

The above-mentioned materials were thoroughly kneaded together with an appropriate amount of pure water through use of a mortar grinder, and the kneaded mixed material was dried at 120° C. overnight. After that, the dried mixed material was roughly crushed through use of a mortar and a pestle, and thoroughly crushed through use of the mortar grinder. Then, the resultant material was fired at 1,300° C. for 4 hours in the atmosphere through use of a box-type electric furnace to obtain a fired body.

After that, in the same way as in the case of producing the YPV red phosphors of Examples 18 and 36, the fired body obtained by firing under the above-mentioned temperature condition was subjected to an aftertreatment (a series of treatments including rough crushing, water crushing, classification, water washing, filtration, acid washing, alkali washing, water washing, and drying) to obtain rare earth phosphovanadate phosphors of Examples 39 and 40.

Figure 24:
FIG. 24 is electron micrographs of rare earth phosphovanadate phosphors according to examples and a comparative example.
Figure 24:
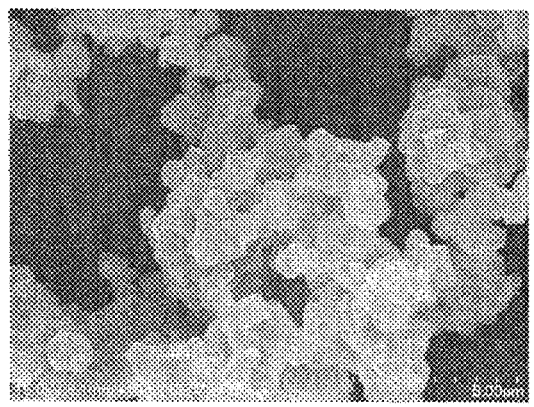
Figure 24:
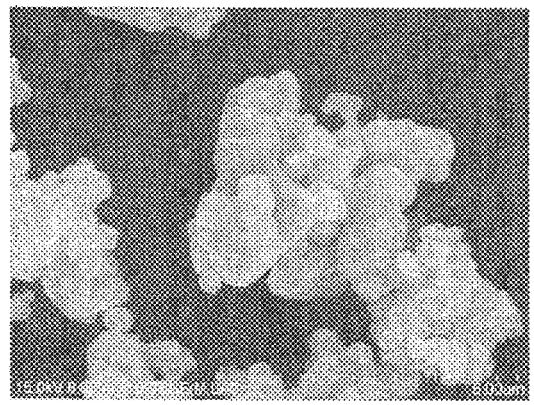

FIGS. 24(a) and 24(b) are electron micrographs magnified by 10,000 times of the rare earth phosphovanadate phosphors thus produced. FIG. 24(a) shows the YPV phosphor of Example 39, and FIG. 24(b) shows the YPV phosphor of Example 40.

Further, for reference, FIG. 24(c) shows, as Comparative Example 9, an electron micrograph of a commercially available YPV phosphor for a PDP that is to have almost the same composition (Eu replacement amount: 4 to 5 atomic %, phosphorus ratio: 62 atomic %) as that of Example 39.

As shown in FIGS. 24(a) and 24(b), the rare earth phosphovanadate phosphors produced by the production method in the present disclosure were a particle group in which primary particles flocculated, and a primary particle size thereof was about 1 μm, which was relatively smaller than that of Comparative Example 9.

Note that, although it was recognized that the primary particles tend to flocculate slightly due to the addition of $SiO_2$, the degree of flocculation was smaller than that of Comparative Example 9.

Even in Examples 39 and 40 differing slightly in terms of a composition, the particle size of the rare earth phosphovanadate phosphors was reduced by setting the added amount "x" of potassium metavanadate ($KVO_3$) to 3 moles (x=0.03).

Hereinafter, the results obtained by comparing various characteristics of the YPV phosphors of Examples 39 and 40 with those of Comparative Example 9 are described FIG. 25 is a graph showing X-ray diffraction patterns of the YPV phosphors of Examples 39 and 40 and Comparative Example 9.

In FIG. 25, reference numeral 141 denotes the X-ray diffraction pattern of the YPV phosphor of Example 39, reference numeral 142 denotes the X-ray diffraction pattern of the YPV phosphor of Example 40, and reference numeral 143 denotes the X-ray diffraction pattern of the YPV phosphor of Comparative Example 9.

The X-ray diffraction patterns shown in FIG. 25 show that the X-ray diffraction pattern 141 of Example 39 and the X-ray diffraction pattern 142 of Example 40 exhibit patterns similar to the X-ray diffraction pattern 143 of Comparative Example 9. It is understood from this result that the YPV phosphors of Examples 39 and 40 are YPV red phosphors of a single crystal phase in terms of a crystal structure.

Note that, as shown in FIG. 25, the main diffraction peak intensity in the vicinity of 25.5° of a diffraction angle (2θ) of the X-ray diffraction pattern 142 of Example 40 was relatively larger than that of the X-ray diffraction pattern 141 of Example 39 and was comparable to that of the X-ray diffraction pattern 143 of Comparative Example 9.

Further, the half-value width of the main diffraction peak in the vicinity of 25.5° of a diffraction angle (2θ) was 0.120° in the X-ray diffraction pattern 141 of Example 39, whereas the half-value width of the main diffraction peak in the vicinity of 25.5° of a diffraction angle (2θ) was 0.072° in the X-ray diffraction pattern 142 of Example 40, which was the same as that of the X-ray diffraction pattern 143 of Comparative Example 9.

These results show that, in the comparison between the YPV phosphors of Examples 39 and 40, the YPV phosphor of Example 40 is a YPV red phosphor closer to the YPV phosphor of Comparative Example 9 in terms of crystallinity.

FIG. 26 is a graph showing emission spectra obtained when the YPV phosphors of Examples 39 and 40 and Comparative Example 9 are irradiated with vacuum ultraviolet rays having a wavelength of 146 nm by an excimer light source.

In FIG. 26, reference numeral 151 denotes the emission spectrum of the YPV phosphor of Example 39, reference numeral 152 denotes the emission spectrum of the YPV phosphor of Example 40, and reference numeral 153 denotes the emission spectrum of the YPV phosphor of Comparative Example 9. The actually obtained data exhibited substantially the same emission spectrum characteristics, and in FIG. 26, the emission spectra of the three phosphors cannot be discriminated from each other.

As is apparent from FIG. 26, the spectral distributions of fluorescent light emitted by the YPV phosphors of Examples 39 and 40 are the same as the spectral distribution of fluorescent light emitted by the YPV phosphor of Comparative Example 9 in a wide wavelength range of 350 nm to 730 nm. This shows that YPV red phosphors having a composition close to that of a YPV red phosphor represented by a general formula: $(Y_{0.95}Eu_{0.05})(P_{0.62}V_{0.38})O_4$ were produced as the YPV red phosphors of Examples 39 and 40.

Figure 27:
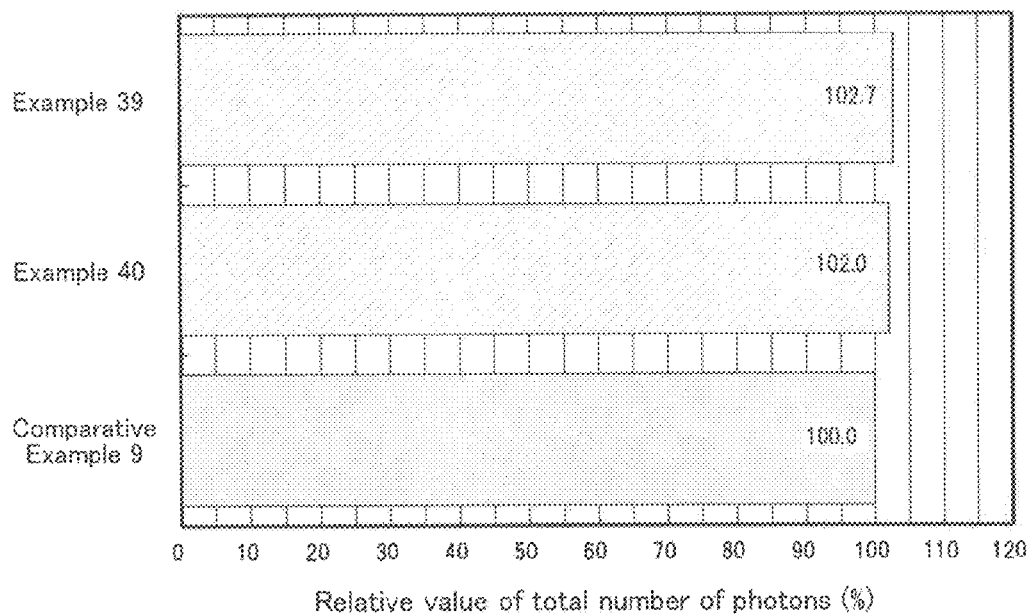
FIG. 27 is a graph showing a comparison of the emission characteristics of the rare earth phosphovanadate phosphors according to the examples and the comparative example.

FIG. 27 shows results obtained by normalizing the total number of photons of fluorescent light (red light) obtained under a 146 nm excitation condition with the total number of photons of the YPV phosphor of Comparative Example 9 being 100, regarding the YPV phosphor of Example 39 and the YPV phosphor of Example 40. Note that the relative values of the total number of photons were obtained by calculation from emission spectrum data for each 1 nm in a wavelength range of 350 nm or more and 730 nm or less.

As shown in FIG. 27, the total number of photons of the YPV phosphor of Example 39 and the total number of photons of the YPV phosphor of Example 40 were 102% to 103%, which was a high level relative to the total number of photons of the YPV phosphor of Comparative Example 9. Further, although data is not shown, the relative luminance of the YPV red phosphor and the main peak height in the vicinity of 619 nm of an emission spectrum of the YPV phosphor of Example 39 and the YPV phosphor of Example 40 were at a level higher by several % compared with those of the YPV phosphor of Comparative Example 9 in the same way as in the comparison results of the total number of photons shown in FIG. 27.

This shows that, according to the method for producing a rare earth phosphovanadate phosphor in the present disclosure, a rare earth phosphovanadate phosphor exhibiting emission characteristics equal to or higher than those of the YPV phosphor shown as Comparative Example 9 was produced.

Figure 28:
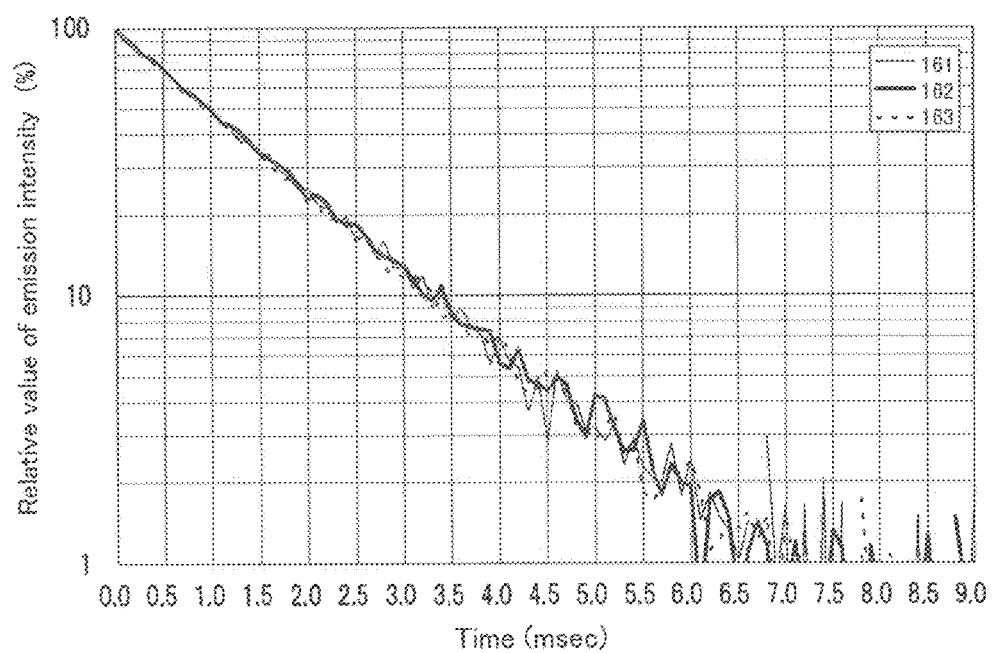
FIG. 28 is a graph showing afterglow properties of the rare earth phosphovanadate phosphors according to the examples and the comparative example.

FIG. 28 shows results obtained by measuring a change in relative value of emission intensity with respect to the passage of time as afterglow properties of a red emission component obtained under a 250 nm excitation condition, regarding the YPV phosphor of Example 39, the YPV phosphor of Example 40, and the YPV phosphor of Comparative Example 9.

In FIG. 28, reference numeral 161 denotes the emission intensity of Example 39, reference numeral 162 denotes the emission intensity of Example 40, and reference numeral 163 denotes the emission intensity of Comparative Example 9. FIG. 28 shows the results obtained by measuring and evaluating the afterglow properties through use of dedicated software of a spectrofluoro-photometer FP-6500 (manufactured by JASCO Corporation) at a monitor wavelength of 620 nm.

As shown in FIG. 28, the afterglow properties of the YPV phosphor of Example 39 and the YPV phosphor of Example 40 were almost equal to such a degree as to substantially overlap the afterglow properties of the YPV phosphor of Comparative Example 9 on a graph, and the 1/10 afterglow indicating time required for emission intensity to reach 1/10 was about 3.3 msec in any case.

This shows that the rare earth phosphovanadate phosphor having short afterglow properties equal to those of the YPV phosphor of Comparative Example 9 was produced by the method for producing a rare earth phosphovanadate phosphor in the present disclosure.

Figure 29:
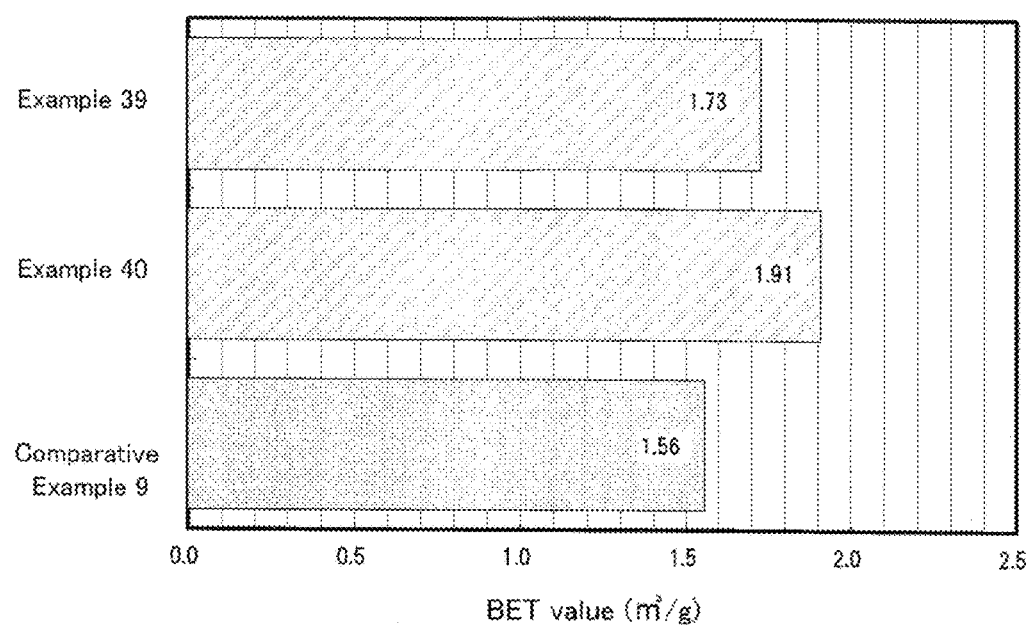
FIG. 29 is a graph showing a comparison of specific surface areas of the rare earth phosphovanadate phosphors according to the examples and the comparative example.

FIG. 29 shows values of specific surface areas of phosphors evaluated by a BET fluid process using nitrogen gas, regarding the YPV phosphor of Example 39, the YPV phosphor of Example 40, and the YPV phosphor of Comparative Example 9.

The specific surface area (BET value) of a phosphor was measured under the condition of a nitrogen gas flow rate of 25 ml/min by a one-point method through use of Macsorb HM-model-1201 (model name) manufactured by Mountech Co., Ltd.

As illustrated in FIG. 29, it was confirmed that the specific surface area of the YPV phosphor of Example 39 is a BET value of 1.73 $m^2/g$, and the specific surface area of the YPV phosphor of Example 40 is a BET value of 1.91 $m^2/g$, and those YPV phosphors have a specific surface area larger by about 120% relative to a BET value of 1.56 $m^2/g$ of the specific surface area of the YPV phosphor of Comparative Example 9.

For example, as an exemplary condition of a phosphor to be used preferably in a phosphor layer of a PDP used in a plasma display device displaying a 3D image for displaying a three-dimensional image, it is requested that a BET value measured by the BET fluid process be more than 1.6 m$^2$/g and less than 2.5 m$^2$/g, more preferably less than 2.0 m$^2$/g. It was confirmed that the YPV phosphor of Example 39 and the YPV phosphor of Example 40 exhibit a BET value in the above-mentioned range and can be used preferably in a PDP for displaying a three-dimensional image.

This shows that, according to the method for producing a rare earth phosphovanadate phosphor in the present disclosure, a rare earth phosphovanadate phosphor was produced, which had a specific surface area larger by about 20% than the YPV phosphor of Comparative Example 9 and which was more suitable for practical use and considered to be a small-particle type.

Further, the rare earth phosphovanadate phosphors described as Examples 39 and 40 are represented by a general formula: $(Y_{0.95}Eu_{0.05})(P_{0.62}V_{0.38})O_4$, and hence, have features that the use amount of more expensive Eu is small and cost is low, compared with the other YPV phosphors described above.

As described above, according to the method for producing a rare earth phosphovanadate phosphor in the present disclosure, a rare earth phosphovanadate phosphor of a small-particle type, satisfying both the short afterglow properties and high efficiency, which can be considered to enhance the performance of a PDP, for example, in the case where the phosphor is used in the PDP used in a display device for displaying a 3D image can be produced by an ordinary solid phase reaction suitable for industrial production.

[Note 1]
A rare earth phosphovanadate phosphor including at least a primary particle having a shape of a pseudo-octahedron or an uneven pattern on a surface of the particle, wherein the uneven pattern has a linear pattern that seems to flow in one direction.

[Note 2]
The rare earth phosphovanadate phosphor according to Note 1, activated with Eu$^{3+}$.

[Note 3]
The rare earth phosphovanadate phosphor according to Note 1, including a particle group in which the primary particles flocculate.

[Note 4]
The rare earth phosphovanadate phosphor according to Note 1, wherein a linear pattern of the primary particle is formed when a substance to be an impurity is removed.

[Note 5]
The rare earth phosphovanadate phosphor according to Note 4, wherein the substance to be the impurity is an alkali metal compound.

[Note 6]
A method for producing a rare earth phosphovanadate phosphor, including forming a mixture of a rare earth phosphovanadate phosphor and an alkali metal vanadate, and removing an alkali metal compound.

[Note 7]
The method for producing a rare earth phosphovanadate phosphor according to Note 6, wherein the alkali metal is potassium.

[Note 8]
The method for producing a rare earth phosphovanadate phosphor according to Note 6, wherein the mixture contains no boron.

INDUSTRIAL APPLICABILITY

As described above, the rare earth phosphovanadate phosphor of the present invention is useful for a light-emitting device, in particular, a display device capable of performing a display with high luminance and high color gamut, as a rare earth phosphovanadate phosphor excellent in emission characteristics and preferred also from the viewpoint of industrial production. Further, the method for producing a rare earth phosphovanadate phosphor of the present invention is useful as a method capable of producing a rare earth phosphovanadate phosphor that is not only excellent in emission characteristics but also is preferred from the viewpoint of industrial production through use of a process that is excellent industrially and can be made simple and low-cost.

The invention claimed is:

1. A rare earth phosphovanadate phosphor comprising at least a primary particle in which a linear uneven pattern including a plurality of ridge lines parallel to each other is formed on a surface of the particle.

2. The rare earth phosphovanadate phosphor according to claim 1, activated with Eu$^{3+}$.

3. The rare earth phosphovanadate phosphor according to claim 1, which is a particle group in which the primary particles aggregate.

4. The rare earth phosphovanadate phosphor according to claim 1, wherein the linear uneven pattern on the surface of the primary particle is formed when alkali metal vanadate is removed,
wherein the alkali metal vanadate comprises an alkali metal metavanadate.

5. A method for producing a rare earth phosphovanadate phosphor, comprising:
forming a mixture of a rare earth phosphovanadate phosphor and an alkali metal vanadate; and
removing a substance comprising the alkali metal vanadate from the mixture,
wherein the forming step is performed by a process comprising:
mixing a rare earth compound, a phosphorous compound, and a vanadium compound in amounts to form the rare earth phosphovanadate phosphor with an alkali metal compound as a flux so that a blended material is formed; and
firing the blended material so as to form the mixture, and
the alkali metal vanadate comprises an alkali metal metavanadate, and
the produced rare earth phosphovanadate phosphor comprises at least a primary particle in which a linear uneven pattern including a plurality of ridge lines parallel to each other is formed on a surface of the particle.

6. The method for producing a rare earth phosphovanadate phosphor according to claim 5, wherein the alkali metal vanadate is potassium vanadate.

7. The method for producing a rare earth phosphovanadate phosphor according to claim 5, wherein the mixture of the rare earth phosphovanadate phosphor and the alkali metal vanadate contains no boron.

8. The method for producing a rare earth phosphovanadate phosphor according to claim 5, wherein a vanadate containing an alkali metal is used as the flux.

9. The method for producing a rare earth phosphovanadate phosphor according to claim 8, wherein an added amount of the flux is 0.01 moles or more and 0.04 moles or less with respect to one mole of a rare earth phosphovanadate phosphor to be produced.

10. The method for producing a rare earth phosphovanadate phosphor according to claim 5, wherein silicon oxide is added as an impurity.

11. The method for producing a rare earth phosphovanadate phosphor according to claim 10, wherein an added amount of silicon oxide is 0.003 moles or more and 0.03 moles or less with respect to one mole of a rare earth phosphovanadate phosphor to be produced.

12. The method for producing a rare earth phosphovanadate phosphor according to claim 5, wherein a BET value of the rare earth phosphovanadate phosphor formed by the method of claim 5, measured by a BET fluid process is more than 1.6 $m^2/g$ and less than 2.5 $m^2/g$.

13. The method for producing a rare earth phosphovanadate phosphor according to claim 5, wherein the removing step comprises forming a suspension comprising a rare earth phosphovanadate phosphor particle group and a metavanadate aqueous solution by water crushing of the mixture resulting from the firing step in water.

14. A method for producing a rare earth phosphovanadate phosphor, comprising:
    forming a mixture of a rare earth phosphovanadate phosphor and an alkali metal vanadate; and
    removing an alkali metal compound from the mixture,
    wherein the resulting rare earth phosphovanadate phosphor comprises a flocculate of primary particles,
    the primary particles forming the flocculate exhibit a pseudo regular octahedron shape that is a regular octahedron shape as a whole, but in which each edge present at a boundary of each surface is rounded,
    the alkali metal compound is a vanadate salt of an alkali metal, and
    the forming comprises:
        generating the rare earth phosphovanadate phosphor and the alkali metal vanadate separately; and
        mixing the rare earth phosphovanadate phosphor and the alkali metal vanadate as so to generate the mixture of the rare earth phosphovanadate phosphor and the alkali metal vanadate.

15. A method for producing a rare earth phosphovanadate phosphor, comprising:
    generating a mixture of a rare earth phosphovanadate phosphor and an alkali metal vanadate; and
    removing alkali metal vanadate from the mixture by a step comprising water washing of the mixture and extracting of the rare earth phosphovanadate phosphor,
    wherein the alkali metal vanadate comprises an alkali metal metavanadate, and
    the produced rare earth phosphovanadate phosphor comprises at least a primary particle in which a linear uneven pattern including a plurality of ridge lines parallel to each other is formed on a surface of the particle.

16. The method for producing a rare earth phosphovanadate phosphor according to claim 15, wherein the water washing step comprises water crushing of the mixture in water as a solvent.

17. The method for producing a rare earth phosphovanadate phosphor according to claim 15, wherein both the water washing of the mixture and extracting of the rare earth phosphovanadate phosphor is performed by filtration.

18. The method for producing a rare earth phosphovanadate phosphor according to claim 16, further comprising a step of crushing the mixture before the water washing treatment.

19. The method for producing a rare earth phosphovanadate phosphor according to claim 15, wherein the water crushing of the mixture forms a suspension comprising a rare earth phosphovanadate phosphor particle group and a metavanadate aqueous solution.

* * * * *